(12) United States Patent
Bakker

(10) Patent No.: US 11,343,742 B2
(45) Date of Patent: *May 24, 2022

(54) PRESERVING EMERGENCY CALL DURING FAILURE TO TRANSFER

(71) Applicant: BlackBerry Limited, Waterloo (CA)

(72) Inventor: Jan Hendrik Lucas Bakker, Fort Worth, TX (US)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/882,245

(22) Filed: May 22, 2020

(65) Prior Publication Data

US 2021/0368319 A1 Nov. 25, 2021

(51) Int. Cl.
| | |
|---|---|
| *H04W 36/14* | (2009.01) |
| *H04W 60/00* | (2009.01) |
| *H04W 36/00* | (2009.01) |
| *H04W 76/50* | (2018.01) |
| *H04W 60/04* | (2009.01) |
| *H04W 76/18* | (2018.01) |
| *H04W 4/90* | (2018.01) |

(52) U.S. Cl.
CPC ............ *H04W 36/14* (2013.01); *H04W 4/90* (2018.02); *H04W 36/0022* (2013.01); *H04W 60/00* (2013.01); *H04W 60/005* (2013.01); *H04W 60/04* (2013.01); *H04W 76/18* (2018.02); *H04W 76/50* (2018.02)

(58) Field of Classification Search
CPC ....... H04W 4/90; H04W 76/50; H04W 60/00; H04W 76/18; H04W 36/14; H04W 36/022; H04W 60/005; H04W 60/04
See application file for complete search history.

(56) References Cited

U.S. PATENT DOCUMENTS

| | | | |
|---|---|---|---|
| 10,681,072 | B2 | 6/2020 | Alfano et al. |
| 2011/0171926 | A1 | 7/2011 | Faccin et al. |
| 2012/0077456 | A1 | 3/2012 | Tiwari |
| 2012/0115431 | A1 | 5/2012 | Kim et al. |
| 2012/0208486 | A1 | 8/2012 | Liao |
| 2013/0016607 | A1 | 1/2013 | Tiwari |
| 2013/0017801 | A1 | 1/2013 | Shaikh |

(Continued)

FOREIGN PATENT DOCUMENTS

| | | |
|---|---|---|
| CN | 102843741 A | 12/2012 |
| CN | 110785983 A | 2/2020 |
| EP | 2852215 A1 | 3/2015 |

OTHER PUBLICATIONS

Office Action dated Sep. 17, 2020; U.S. Appl. No. 16/906,941, filed Jun. 19, 2020; 14 pages.

(Continued)

*Primary Examiner* — Marcos L Torres
(74) *Attorney, Agent, or Firm* — Conley Rose, P. C.; J. Robert Brown, Jr.

(57) ABSTRACT

A system and method in a user equipment (UE) for transferring an emergency session from a first network to a second network. The method includes transmitting a first registration request message to the second network; receiving a registration reject message from the second network; detecting the emergency session between the UE and the first network is ongoing; transmitting a second registration request message comprising an emergency registration request to the second network; and receiving a registration accept message for the emergency session.

14 Claims, 20 Drawing Sheets

(56) References Cited

U.S. PATENT DOCUMENTS

| | | |
|---|---|---|
| 2013/0130688 A1 | 5/2013 | Chin et al. |
| 2014/0204736 A1 | 7/2014 | Bakker et al. |
| 2015/0351136 A1 | 12/2015 | Kaura et al. |
| 2016/0295385 A1 | 10/2016 | Wang et al. |
| 2016/0345210 A1 | 11/2016 | Shan et al. |
| 2016/0366574 A1 | 12/2016 | Dahan et al. |
| 2017/0289883 A1 | 10/2017 | Kiss et al. |
| 2017/0366955 A1 | 12/2017 | Edge |
| 2018/0295659 A1 | 10/2018 | Shan |
| 2018/0376384 A1 | 12/2018 | Youn |
| 2019/0159157 A1 | 5/2019 | Gupta |
| 2019/0274076 A1 | 9/2019 | Kim et al. |
| 2019/0342940 A1 | 11/2019 | Ryu et al. |
| 2020/0015311 A1 | 1/2020 | Kim |

OTHER PUBLICATIONS

Notice of Allowance dated Nov. 6, 2020; U.S. Appl. No. 16/906,941, filed Jun. 19, 2020; 13 pages.
Jan Hendrik Lucas Bakker; U.S. Appl. No. 16/906,941, filed Jun. 19, 2020; Title: Preserving Emergency Call During Failure to Transfer; 76 pages.
3GPP TS 24.301 v16.4.0.; 3rd Generation Partnership Project; Technical Specification Group Core Network and Terminals; Non-Access-Stratum (NAS) Protocol for Evolved Packet System (EPS); Stage 3; Release 16; Mar. 2020; 573 pages.
3GPP TS 24.501 v16.4.1.; 3rd Generation Partnership Project; Technical Specification Group Core Network and Terminals; Non-Access-Stratum (NAS) Protocol 5G System (5GS); Stage 3; Release 16; Mar. 2020; 666 pages.
PCT International Search Report & Written Opinion of the International Searching Authority; PCT/EP2020/078513; dated Mar. 4, 2021; 16 pages.

5.3.11 Power saving mode

The UE can request the use of power saving mode (PSM) during an attach or tracking area updating procedure (see 3GPP TS 23.682 [11A] and 3GPP TS 23.401 [10]). The UE shall not request the use of PSM during:

- an attach for emergency bearer services procedure;
- an attach procedure ~~for initiating a PDN connection for emergency bearer services~~ with attach type not set to "EPS emergency attach" <ins>and</ins>:
  a) <ins>for initiating a PDN connection for emergency bearer services; or</ins>
  b) <ins>for transmission of a PDN CONNECTIVITY REQUEST message with request type set to "handover" while the UE intends to transmit a standalone PDN CONNECTIVITY REQUEST message with request type set to "handover of emergency bearer services".</ins>
- a tracking area updating procedure for initiating a PDN connection for emergency bearer established for services;
- a tracking area updating procedure when the UE has a PDN connection established for emergency bearer services; or
- an attach for access to RLOS.

5.3.15 CIoT EPS optimizations

[...]

In NB-S1 mode, the UE, when requesting the use of CIoT EPS optimization, does not:

- request an attach for emergency bearer services procedure;

- request an attach procedure ~~for initiating a PDN connection for emergency bearer services~~ with attach type not set to "EPS emergency attach"~~;~~ and:

a) for initiating a PDN connection for emergency bearer services; or b) <u>for transmission of a PDN CONNECTIVITY REQUEST message with request type set to "handover" while the UE intends to transmit a standalone PDN CONNECTIVITY REQUEST message with request type set to "handover of emergency bearer services".</u>

- indicate voice domain preference and UE's usage setting; or

- request an attach for access to RLOS.

5.5.1.2.5A Attach for emergency bearer services not accepted by the network

[...]

If the attach request for emergency bearer services fails or is rejected due to receiving an ATTACH REJECT, and the UE proceeds to inform the upper layers of the failure to access the network.

NOTE: Informing the upper layers can result in the upper layers requesting establishment of a CS emergency call (if not already attempted in the CS domain), transfer to non-3GPP access, or other implementation specific mechanisms, e.g. procedures specified in 3GPP TS 24.229 [13D] can result in the emergency call being attempted or transferred to another IP-CAN.

[...]

In a shared network, upon receiving the ATTACH REJECT message, the UE shall perform the actions as described in subclause 5.5.1.2.5, and shall:

a) inform the upper layers of the failure of the procedure; or
b) attempt the attach for emergency bearer services to another PLMN in the shared network, if the ATTACH REQUEST message did not include a PDN CONNECTIVITY REQUEST message with request type set to "handover of emergency bearer services" or the ATTACH REQUEST message did include a PDN CONNECTIVITY REQUEST message with request type set to "handover of emergency bearer services" and the other PLMN is an equivalent PLMN.

In a shared network, if the attach request for emergency bearer services fails due to abnormal case a) in subclause 5.5.1.2.6, the UE shall perform the actions as described in subclause 5.5.1.2.6 and shall:

a) inform the upper layers of the failure to access the network; or
b) attempt the attach for emergency bearer services to another PLMN in the shared network, if the ATTACH REQUEST message did not include a PDN CONNECTIVITY REQUEST message with request type set to "handover of emergency bearer services" or the ATTACH REQUEST message did include a PDN CONNECTIVITY REQUEST message with request type set to "handover of emergency bearer services" and the other PLMN is an equivalent PLMN.

In a shared network, if the attach request for emergency bearer services fails due to abnormal cases b), c) or d) in subclause 5.5.1.2.6, the UE shall perform the actions as described in subclause 5.5.1.2.6, and shall:

a) inform the upper layers of the failure of the procedure; or
b) attempt the attach for emergency bearer services to another PLMN in the shared network, if the ATTACH REQUEST message did not include a PDN CONNECTIVITY REQUEST message with request type set to "handover of emergency bearer services" or the ATTACH REQUEST message did include a PDN CONNECTIVITY REQUEST message with request type set to "handover of emergency bearer services" and the other PLMN is an equivalent PLMN.

FIG. 8

5.5.1.2.5B  Attach for initiating a PDN connection for emergency bearer services not accepted by the network

If the network cannot accept attach request including a PDN CONNECTIVITY REQUEST message with request type set to "emergency" ~~for initiating a PDN connection for emergency bearer services~~ and with attach type not set to "EPS emergency attach", the UE shall perform the procedures as described in subclause 5.5.1.2.5. Then if the UE is in the same selected PLMN where the last attach request was attempted, the UE shall:

a)    inform the upper layers of the failure of the procedure; or b)    attempt EPS attach for emergency bearer services with the same network.

If the network cannot accept attach request including a PDN CONNECTIVITY REQUEST message with request type set to "handover of emergency bearer services" and with attach type not set to "EPS emergency attach", the UE shall attempt EPS attach for emergency bearer services with the same network.

If the attach request for initiating a PDN connection for emergency bearer services with attach type not set to "EPS emergency attach" fails due to abnormal case a) in subclause 5.5.1.2.6, the UE shall perform the actions as described in subclause 5.5.1.2.6 and inform the upper layers of the failure to access the network.

If the attach request including a PDN CONNECTIVITY REQUEST message with request type set to "emergency ~~for initiating a PDN connection for emergency bearer services~~" and with attach type not set to "EPS emergency attach" fails due to abnormal cases b), c) or d) in subclause 5.5.1.2.6, the UE shall perform the procedures as described in subclause 5.5.1.2.6. Then if the UE is in the same selected PLMN where the last attach request was attempted, the UE shall:

a)    inform the upper layers of the failure of the procedure; or b)    attempt EPS attach for emergency bearer services including the PDN CONNECTIVITY REQUEST message.

If the attach request including a PDN CONNECTIVITY REQUEST message with request type set to "handover of emergency bearer services" and with attach type not set to "EPS emergency attach" fails due to abnormal cases b), c), d) or o) in subclause 5.5.1.2.6, the UE shall attempt EPS attach for emergency bearer services including the PDN CONNECTIVITY REQUEST message.

FIG. 9

5.5.1.2.5B1 Attach by a UE transferring an emergency PDU session using a standalone PDN CONNECTIVITY REQUEST message

If the network cannot accept attach request including a PDN CONNECTIVITY REQUEST message with request type set to "handover" and the UE also intends to transfer an emergency PDU session, the UE shall attempt EPS attach for emergency bearer services including a PDN CONNECTIVITY REQUEST message with request type set to "handover of emergency bearer services" for the emergency PDU session.

If the attach request, including a PDN CONNECTIVITY REQUEST message with request type set "handover", fails due to abnormal case a) in subclause 5.5.1.2.6 and the UE intends to transfer an emergency PDU session, the UE shall attempt EPS attach including a PDN CONNECTIVITY REQUEST message with request type set to "handover of emergency bearer services" for the emergency PDU session.

If the attach request including a PDN CONNECTIVITY REQUEST message with request type set "handover" fails due to abnormal cases b), c), d) or o) in subclause 5.5.1.2.6, the UE intends to transfer an emergency PDU session, if

- _____ an the EMM cause set to #19 "ESM failure" is received, the UE shall attempt EPS attach; and
- _____ otherwise, the UE shall attempt EPS attach for emergency bearer services;

including a PDN CONNECTIVITY REQUEST message with request type set to "handover of emergency bearer services" for the emergency PDU session.

FIG. 10

5.5.1.2.6 Abnormal cases in the UE

The following abnormal cases can be identified:

a) Access barred because of access class barring, EAB, ACDC or NAS signalling connection establishment rejected by the network without "Extended wait time" received from lower layers In WB-S1 mode, if access is barred for "originating signalling" (see 3GPP TS 36.331 [22]), the attach procedure shall not be started. The UE stays in the current serving cell and applies the normal cell reselection process. The attach procedure is started as soon as possible, i.e. when access for "originating signalling" is granted on the current cell or when the UE moves to a cell where access for "originating signalling" is granted.

[...]

b) Lower layer failure or release of the NAS signalling connection without "Extended wait time" and without "Extended wait time CP data" received from lower layers before the ATTACH ACCEPT or ATTACH REJECT message is received The attach procedure shall be aborted, and the UE shall proceed as described below.

c) T3410 timeout

The UE shall abort the attach procedure and proceed as described below. The NAS signalling connection, if any, shall be released locally.

d) ATTACH REJECT, other EMM cause values than those treated in subclause 5.5.1.2.5, and cases of EMM cause values #22, #25 and #31, if considered as abnormal cases according to subclause 5.5.1.2.5

Upon reception of the EMM cause #19 "ESM failure", if the UE is not configured for NAS signalling low priority and the ESM cause value received in the PDN CONNECTIVITY REJECT message is not #54 "PDN connection does not exist", the UE may set the attach attempt counter to 5. Subsequently, if the UE needs to retransmit the ATTACH REQUEST message to request PDN connectivity towards a different APN, the UE may stop T3411 or T3402, if running, and send the ATTACH REQUEST message. If the UE needs to attempt EPS attach to request transfer of a PDN connection for emergency bearer services by including a PDN CONNECTIVITY REQUEST message with request type set to "handover of emergency bearer services", the UE shall stop T3411 or T3402, if running, and send the ATTACH REQUEST message.

NOTE 3: When receiving EMM cause #19 "ESM failure", coordination is required between the EMM and ESM sublayers in the UE to determine whether to set the attach attempt counter to 5.

If the attach request is neither for emergency bearer services nor for initiating a PDN connection for emergency bearer services with attach type not set to "EPS emergency attach", upon reception of the EMM causes #95, #96, #97, #99 and #111 the UE should set the attach attempt counter to 5.

The UE shall proceed as described below.

e) [...]
o) Timer T3447 is running

The UE shall not start the attach procedure unless:
- the UE is a UE configured to use AC11 – 15 in selected PLMN;
- the UE attempts to attach for emergency bearer services; or
- the UE attempts to attach without PDN connection request.

The UE stays in the current serving cell and applies the normal cell reselection process. The attach request procedure is started, if still necessary, when timer T3447 expires.

For the cases b, c, d, I, la and m:
- Timer T3410 shall be stopped if still running.
- For the cases b, c, d, l when the "Extended wait time" is ignored, and la when the "Extended wait time CP data" is ignored, if the attach request is neither for emergency bearer services nor for initiating a PDN connection for emergency bearer services with attach type not set to "EPS emergency attach", the attach attempt counter shall be incremented, unless it was already set to 5.
- If the attach attempt counter is less than 5:
 [...];
- for the cases b, c, d, l when the "Extended wait time" is ignored, and la when the "Extended wait time CP data" is ignore, if the attach request is neither for emergency bearer services nor for initiating a PDN connection for emergency bearer services with attach type not set to "EPS emergency attach", timer T3411 is started and the state is changed to EMM-DEREGISTERED.ATTEMPTING-TO-ATTACH. When timer T3411 expires the attach procedure shall be restarted, if still required by ESM sublayer.
- [...];

FIG. 11B

5.5.1.2.6 Initial registration for emergency services not accepted by the network

[...]

Upon receiving the REGISTRATION REJECT message or the registration request fails, the UE shall perform the actions as described in subclause 5.5.1.2.5 with the following addition: the UE shall inform the upper layers of the failure of the procedure.

NOTE: This can result in the upper layers requesting transfer to non-3GPP access or implementation specific mechanisms, e.g. procedures specified in 3GPP TS 24.229 [14] can result in the emergency call being attempted to another IP-CAN.

[...]

In a shared network, upon receiving the REGISTRATION REJECT message, the UE shall perform the actions as described in subclause 5.5.1.2.5, and shall:

a) inform the upper layers of the failure of the procedure; or b) attempt to perform a PLMN selection in the shared network and initiate an initial registration for emergency services to the selected PLMN, if the REGISTRATION REQUEST message is not for sending a PDU SESSION ESTABLISMENT message with request type set to "existing emergency PDU session" or the REGISTRATION REQUEST message is for sending a PDU SESSION ESTABLISHMENT message with request type set to "existing emergency PDU session" and the other PLMN is an equivalent PLMN.

In a shared network, if the initial registration request for emergency services fails due to abnormal cases, the UE shall perform the actions as described in subclause 5.5.1.2.7 and shall:

a) inform the upper layers of the failure of the procedure; or b) attempt the initial registration for emergency services to another PLMN in the shared network, if the REGISTRATION REQUEST message is not for sending a PDU SESSION ESTABLISHMENT message with request type set to "existing emergency PDU session" or the REGISTRATION REQUEST message is for sending a PDU SESSION ESTABLISMENT message with request type set to "existing emergency PDU session" and the other PLMN is an equivalent PLMN.

FIG. 12

5.5.1.2.6A Initial registration for initiating a PDU session for emergency services not accepted by the network

If the network cannot accept initial registration request for sending a PDU SESSION ESTABLISMENT message with request type set to "initial emergency request" ~~initiating a PDU session for emergency services~~ with 5GS registration type IE set to "initial registration", the UE shall perform the procedures as described in subclause 5.5.1.2.5. Then if the UE is in the same selected PLMN where the last initial registration request was attempted, the UE shall:

a)    inform the upper layers of the failure of the procedure; or b)    attempt initial registration for emergency services.

If the network cannot accept initial registration request for initiating a PDU session for emergency services with 5GS registration type IE set to "initial registration" and the PDU session needs to be established due to handover of an existing PDN connection for emergency bearer services, the UE shall attempt initial registration for emergency services with the same network.

If the initial registration request for initiating a PDU session for emergency services with 5GS registration type IE set to "initial registration" fails due to abnormal cases c), d) or e) in subclause 5.5.1.2.7 and the PDU session does not need to be established due to handover of an existing PDN connection for emergency bearer services, the UE shall perform the actions as described in subclause 5.5.1.2.7. Then if the UE is in the same selected PLMN where the last initial registration request was attempted, the UE shall:

a)    inform the upper layers of the failure of the procedure; or b)    attempt initial registration for emergency services.

If the initial registration request for initiating a PDU session for emergency services with 5GS registration type IE set to "initial registration" fails due to abnormal cases c), d), e) or l) in subclause 5.5.1.2.7 and the PDU session needs to be established due to handover of an existing PDN connection for emergency bearer services, the UE shall attempt initial registration for emergency services.

5.5.1.2.7 Abnormal cases in the UE

The following abnormal cases can be identified:

a)  Timer T3346 is running.

The UE shall not start the registration procedure for initial registration unless:

1) the UE is a UE configured for high priority access in selected PLMN;
    2) the UE needs to perform the registration procedure for initial registration for emergency services;
    3) the UE receives a DEREGISTRATION REQUEST message with the "re-registration required" indication;
    or
    4) the UE in NB-N1 mode is requested by the upper layer to transmit user data related to an exceptional event and:
       - the UE is allowed to use exception data reporting (see the ExceptionDataReportingAllowed leaf of the NAS configuration MO in 3GPP TS 24.368 [17] or the USIM file $EF_{NASCONFIG}$ in 3GPP TS 31.102 [22]); and
       - timer T3346 was not started when N1 NAS signalling connection was established with RRC establishment cause set to "mo-ExceptionData".

The UE stays in the current serving cell and applies the normal cell reselection process.

NOTE 1: It is considered an abnormal case if the UE needs to initiate a registration procedure for initial registration while timer T3346 is running independent on whether timer T3346 was started due to an abnormal case or a non-successful case.

b)  The lower layers indicate that the access attempt is barred.

The UE shall not start the initial registration procedure. The UE stays in the current serving cell and applies the normal cell reselection process. Receipt of the access barred indication shall not trigger the selection of a different core network type (EPC or 5GCN).

The initial registration procedure is started, if still needed, when the lower layers indicate that the barring is alleviated for the access category with which the access attempt was associated.

ba) The lower layers indicate that access barring is applicable for all access categories except categories 0 and 2 and the access category with which the access attempt was associated is other than 0 and 2.

If the REGISTRATION REQUEST message has not been sent, the UE shall proceed as specified for case

FIG. 14A

1400 b. If the REGISTRATION REQUEST message has been sent, the UE shall proceed as specified for case e and, additionally, the registration procedure for initial registration is started, if still needed, when the lower layers indicate that the barring is alleviated for the access category with which the access attempt was associated.

c) T3510 timeout.

The UE shall abort the registration procedure for initial registration and the NAS signalling connection, if any, shall be released locally if the initial registration request is neither~~t~~ for emergency services nor for initiating a PDU session for emergency services with request type set to "existing emergency PDU session". The UE shall proceed as described below.

d) REGISTRATION REJECT message, other 5GMM cause values than those treated in subclause 5.5.1.2.5, and cases of 5GMM cause values #11, #22, #31, #72, #73, #74, #75, #76 and #77, if considered as abnormal cases according to subclause 5.5.1.2.5.

If the registration request is not an initial registration request for emergency services or an initial registration request for initiating a PDU session for emergency services with request type set to "existing emergency PDU session" upon reception of the 5GMM causes #95, #96, #97, #99 and #111 the UE should set the registration attempt counter to 5.

The UE shall proceed as described below.

e) [...]

f) Timer T3447 is running.

The UE shall not start the registration procedure for initial registration with Follow-on request indicator set to "Follow-on request pending" unless:

1) the UE is a UE configured for high priority access in selected PLMN; or 2) the UE needs to perform the registration procedure for initial registration for emergency services.

The UE stays in the current serving cell and applies the normal cell reselection process. The registration procedure for initial registration is started, if still necessary, when timer T3447 expires.

For the cases c, d and e, the UE shall proceed as follows:

Timer T3510 shall be stopped if still running.

If the registration procedure is neither an initial registration for emergency services nor for establishing an emergency PDU session with registration type not set to "emergency registration", the registration attempt counter shall be incremented, unless it was already set to 5.

If the registration attempt counter is less than 5:

- if the initial registration request is not for emergency services, timer T3511 is started and the state is changed to 5GMM-DEREGISTERED.ATTEMPTING-REGISTRATION. When timer T3511 expires the registration procedure for initial registration shall be restarted, if still required.

If the registration attempt counter is equal to 5

- the UE shall delete 5G-GUTI, TAI list, last visited registered TAI, list of equivalent PLMNs (if any), and ngKSI, start timer T3502 and shall set the 5GS update status to 5U2 NOT UPDATED. The state is changed to 5GMM-DEREGISTERED.ATTEMPTING-REGISTRATION or optionally to 5GMM-DEREGISTERED.PLMN-SEARCH in order to perform a PLMN selection or SNPN selection according to 3GPP TS 23.122 [5].

- if the procedure is performed via 3GPP access and the UE is operating in single-registration mode:

- the UE shall in addition handle the EMM parameters EPS update status, EMM state, 4G-GUTI, TAI list, last visited registered TAI, list of equivalent PLMNs and eKSI as specified in 3GPP TS 24.301 [15] for the abnormal cases when an EPS attach procedure fails and the attach attempt counter is equal to 5; and

- the UE shall attempt to select E-UTRAN radio access technology and proceed with appropriate EMM specific procedures. Additionally, The UE may disable the N1 mode capability as specified in subclause 4.9

FIG. 14C

PRESERVING EMERGENCY CALL DURING FAILURE TO TRANSFER

CROSS-REFERENCE TO RELATED APPLICATIONS

Not applicable.

BACKGROUND

As used herein, the term "user equipment" (alternatively "UE") might in some cases refer to mobile devices or wireless devices such as mobile telephones, personal digital assistants, handheld, laptop computers or personal computers, and similar devices that have telecommunications capabilities, including text and email functionality. The terms UE, mobile device, and wireless device may be used interchangeably herein. Such a UE might include a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might include the device itself without such a module. In other cases, the term "UE" might refer to devices that have similar capabilities but that are not transportable, such as desktop computers, set-top boxes, or network appliances. The term "UE" can also refer to any component that can terminate a communication session for a user. Also, the terms "user agent," "UA," "user device," and "mobile device" might be used synonymously herein.

An emergency call or session is a special type of call or session. It usually has a higher priority than other calls in a network, its bearers have different characteristics than other calls, e.g., the bearers could have one or more of a higher priority or higher Quality of Service (QoS). Furthermore, the UE may not need a subscription with a network to request an emergency call. For example, an emergency call can be completed if the UICC is absent, or the UE is associated with an expired or invalid subscription, etc. Interrupting or preventing emergency calls can have dire consequences.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 6 is a proposed change to 3GPP TS24.301 section 5.3.11.

FIG. 7 is a proposed change to 3GPP TS24.301 section 5.3.15.

FIG. 8 is a proposed change to 3GPP TS24.301 section 5.5.1.2.5A.

FIG. 9 is a proposed change to 3GPP TS24.301 section 5.5.1.2.56.

FIG. 10 is a proposed change to 3GPP TS24.301 section 5.5.1.2.561.

FIGS. 11A and 11B are a proposed change to 3GPP TS24.301 section 5.5.1.2.6.

FIG. 12 is a proposed change to 3GPP TS 24.501 section 5.5.1.2.6.

FIG. 13 is a proposed change to 3GPP TS24.501 section 5.5.1.2.6A.

FIGS. 14A, 14B, and 14C are a proposed change to 3GPP TS24.501 section 5.5.1.2.7.

DESCRIPTION

Figure 1:
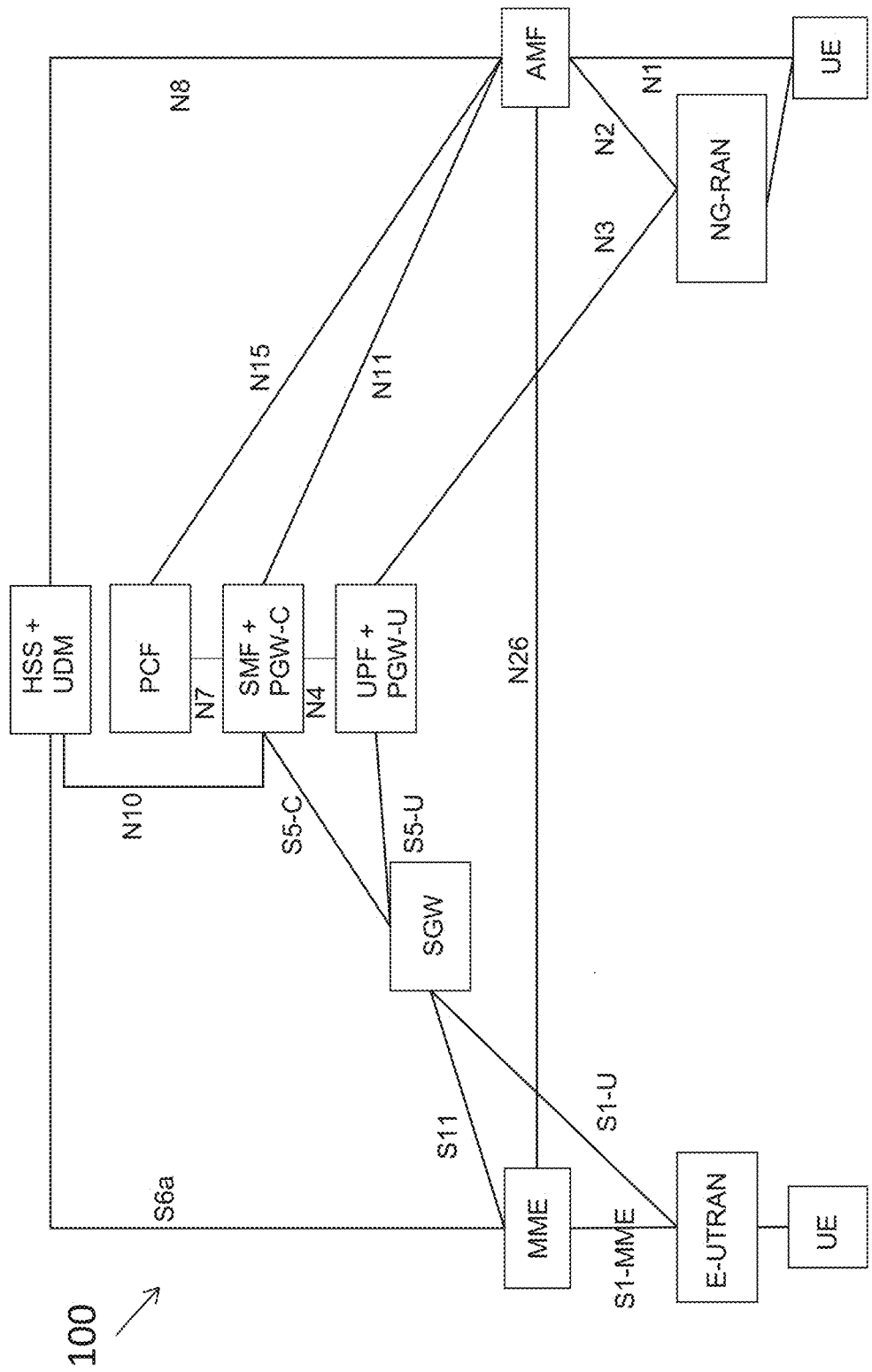
FIG. 1 is a diagram of an embodiment of an architecture for interworking between 5GS and EPC/U-TRAN.

An emergency call may be established by a UE that operates in a single registration mode, i.e., the UE only registers with a single network at any given time (the term registering is considered synonymous for attaching, depending on the context of the use of the term). The network may be a fifth generation (5G) core network supported by an access network or an older network, for example, a typical fourth generation (4G) core network supported by an access network. An example of an access network supporting the 4G core network is evolved universal terrestrial radio access network (E-UTRAN), i.e., an evolved universal terrestrial radio access (E-UTRA) connected to an evolved packet core (EPC). If the emergency call is established in one network (e.g. 5G core network supported by an access network) and there is not interworking between the two networks (e.g. 5G core network supported by an access network and EPC or 4G core network supported by an access network), handover of the emergency call between networks may fail and the emergency call may be dropped. Described herein are several techniques for handing over an emergency call between a 5G core network and an EPC network.

A 5G access network can be at least one of multiple access networks including new radio (NR) and E-UTRA. A 5G access network provides access to the 5G core network (5GC). A wireless local area network (WLAN) can also be used to access the 5GC. A UE uses non-access stratum (NAS) protocols to communicate with a core network via an access network. A typical network element in the EPC for handling of NAS messages, is a mobility management entity (MME). A typical network element in the 5GC, for handling of NAS messages, is an access and mobility management function (AMF) or session management function (SMF). The AMF and SMF are 5G core network nodes.

The NAS protocol consists of a mobility (management) protocol and a session management protocol. An example of an EPC NAS mobility protocol message is an attach message, e.g. the ATTACH REQUEST message. An example of an EPC NAS session management protocol message is a packet data network (PDN) connection request message, e.g. the PDN CONNECTION REQUEST message. An example of a 5GC NAS mobility protocol message is a registration message, e.g. the REGISTRATION REQUEST message. An example of a 5GC NAS session management protocol message is a protocol data unit (PDU) session request message, e.g. the PDU SESSION REQUEST message. The sender of these NAS messages may receive a response message to any of these NAS messages. For example, the response message is a NAS response message, e.g., ATTACH REJECT message, ATTACH ACCEPT message, etc.

A UE can be in a mode or mode of operation. In idle mode (generally as opposed to connected mode) the UE cannot initiate NAS procedures involving session management and involving the session management protocol. A NAS procedure of the mobility management and involving the mobility management protocol is needed to change the UE from idle mode to connected mode.

When performing an EPC NAS registration procedure, the UE can request to be combined attached (e.g., packet switched services provided by the EPC and circuit switched) by an attach procedure (which causes an attach request message to be transmitted by the UE to the network), or request to be attached for evolved packet system (EPS) services only by means of the attach procedure, or request to be attached for emergency bearer services only by means of the attach procedure.

When combined attached, the network or MME has registered the UE in a circuit-switched (CS) domain network node, e.g., a Mobile Switching Center (MSC) or MSC server. In other words, the network registered the UE on behalf of the UE in the CS domain network node. The UE can obtain CS services via a Circuit Switch FallBack (CSFB) after having been successfully combined registered. The attach request message transmitted by the UE to the network can also include a packet data network (PDN) connection request message.

When performing a 5GC NAS registration procedure, the UE can request to be registered by a registration procedure (which causes a registration message to be transmitted by the UE to the network) or request to be registered for emergency bearer services only by means of the registration procedure.

In some communication environments, 4G access networks (i.e. access network connected to 4G core network EPC) are more prevalent than 5G access networks (i.e. access network connected to 5G core network 5GC). A UE may need to transfer existing connections from a 5G access network to a 4G access network (e.g., when handing over from the access network providing access to 5GC), or vice-versa (e.g. when handing over from the access network providing access to EPC). A system, such as EPS and 5GS, includes a core network and an access network.

FIG. 1 is a diagram of an embodiment of an architecture 100 for interworking between 5G and EPC. The N26 interface is an inter-core network (CN) interface between the MME and 5G system (5GS) AMF in order to enable interworking between EPC and the 5G core. Support of N26 interface in the network is optional for interworking.

The core PDN gateway (PGW-C)+SMF and user plane function (UPF)+PDN gateway user plane (PGW-U) are dedicated for interworking between 5GS and EPC, which are optional and are based on UE mobility management (MM) Core Network Capability and UE subscription. UEs that are not subject to 5GS and EPC interworking may be served by entities not dedicated for interworking, i.e. by either by PGW or SMF/UPF.

There can be another UPF (not shown) between the NG radio access network (NG-RAN) and the UPF+PGW-U, i.e. the UPF+PGW-U can support an N9 interface towards an additional UPF, if needed. Figures and procedures in this specification that depict a serving gateway (SGW) make no assumption whether the SGW is deployed as a monolithic SGW or as a serving gateway (SGW) split into its control-plane and user-plane functionality.

Unless the UE is dual registered (e.g. registered with a 5G network and attached with a 4G network), the UE cannot be in connected mode in 5GS and EPS at the same time. For this reason the N26 interface may be used to provide interworking between the 5GS and EPS to allow for handover between the networks.

An emergency call in limited service state occurs, for example, when the UE does not have sufficient credentials to access the network (e.g. the UE may not need a subscription with a network to request an emergency call). A network can also turn an emergency call into a limited service state emergency call when it hands over the emergency call into a cell the UE is otherwise not allowed to access. When a network turns an emergency call by a UE into an emergency call by limited service state UE, the UE is in connected mode. In limited service state, subscription-based services are not or no longer allowed. Subscription-based services generally include common services such as short message service (SMS), non-emergency-voice calls, access to the internet, etc.

When a UE performs an emergency attach procedure with the EPC (i.e. an attach procedure resulting in the sending of an attach request message for emergency bearer services only), the UE cannot obtain non-emergency services while it is so attached. The UE is in limited service state. When a UE performs a (non-emergency) attach procedure with the EPC (i.e. an attach procedure resulting in the sending of an attach request message or attach request message for EPS services only), the UE can use non-emergency services (assuming the attach request is accepted by the network). In either case the sent attach request message can include a PDN connection request for emergency bearer services.

When a UE performs an emergency registration procedure with the 5GC (i.e. a registration procedure resulting in the sending of a registration request message for emergency services only), the UE cannot use non-emergency services while it is so registered. The UE is in limited service state. When a UE performs a (non-emergency) registration procedure with the 5GC (i.e. a registration procedure resulting in the sending of a registration request message), the UE can obtain non-emergency services (assuming the registration request is accepted by the network). In either case, the UE can send a PDU session request to establish a PDU session for emergency services subsequent to sending the registration request message or subsequent to the registration request being accepted by the network.

There are many reasons why an attach request or registration request, sent by a UE, can be rejected by the network. For example, a request can be rejected to due to network failures, network overload, UE subscription limitations or user subscription limitations. Other examples exist.

The 5GS supports interworking with an EPS either via the N26 interface (between AMF and MME) or without an N26 interface (i.e. via coordination between or collocation of PDG and SMF or UPF). The problems discussed herein relate to networks that support interworking without N26 and to a UE that operates in single registration mode.

A UE in dual registration mode, but not yet concurrently registered in the other system is also affected by the problems discussed herein.

A UE in dual registration mode and concurrently registered in the other system is affected by a subset of the problems discussed herein.

When registered in the 5GC via a cell of a 5G access network and when having an emergency PDU session, possibly among other, for example, non-emergency PDU sessions, the UE may determine a cell of a 4G access network is or became more desirable. The UE may need to transfer the ongoing connectivity provided by some or all of the PDU sessions to the EPC serving the cell of the 4G access network, for example, while the UE is in IDLE mode with EPC.

In order to transfer the ongoing connectivity provided by the emergency PDU session from the 5GC to the EPC, the UE performs an attach procedure, and preferably includes a PDN connection request message representing the connectivity provided by the emergency PDU session in the attach message. However, some UEs may also include a PDN connection request message representing the connectivity provided by a non-emergency PDU session in the attach message. In the later case, the UE would have to transfer the connectivity provided by emergency PDU session in a subsequent standalone transmitted PDN connection request message. The UE may subsequently attempt to transfer more (non-emergency) PDU sessions.

In a 4G network, for various reasons the MME or the EPC may not be able to accept the attach request. For example, network congestion or other resource unavailability. etc. In some current approaches, if the attach request is rejected, the ongoing emergency call using the connectivity provided by the emergency PDU session, cannot be transferred to the network. Consequently, the ongoing emergency call may undesirably or prematurely terminate. This may leave the user of the UE, whose emergency call was terminated, in danger.

When attached in the EPC via a cell of a 4G access network and when having a PDN connection for emergency bearer services, possibly among other, for example, non-emergency PDN connections, the UE may determine a cell of a 5G access network is or became more desirable. The UE may need to transfer the ongoing connectivity provided by some or all of the PDN connections to the 5GC serving the cell of the 5G access network, for example, while the UE is in IDLE mode with 5GC.

In order to transfer the ongoing connectivity provided by the PDN connection for emergency bearer services from the EPC to the 5GC, the UE performs a registration procedure, and subsequently transmits a PDU session request message representing the connectivity provided by the PDN connection for emergency bearer services. The UE may also attempt to transfer connectivity provided by one or more (non-emergency) PDN connections.

In a 5G network, for various reasons the AMF or the 5GC may not be able to accept the registration request, for example, network congestion or other resource unavailability, etc. In some current approaches, if the registration request is rejected, the ongoing emergency call using the connectivity provided by the PDN connection for emergency bearer services, cannot be transferred to the network. Consequently, the ongoing emergency call may undesirably or prematurely terminate. This may leave the user of the UE, whose emergency call was terminated, in danger.

The current procedures for transferring ongoing emergency calls from 5G to EPC or from EPC to 5GC insufficiently considers failure scenarios. While solutions exist for handling failure scenarios in case of "fallback" from one system to another system, i.e. prior to establishing an emergency call, solutions have not been considered for preventing unexpected and undesirable termination of an ongoing emergency call during transfer from one system to another system. A further new aspect of this problem space is the scenario where the UE desires to transfer connectivity (including emergency connectivity) from 5GC to EPC, yet the UE omits including a request for emergency connectivity in the attach request sent to the EPC.

In a first embodiment, when the UE has one or more PDU sessions to transfer from 5GS to EPS, the UE performs an attach procedure with a first network including an EPC, the network may reject an attach request message sent by the UE due to the attach procedure (i.e. a first attach request message). Due to the network rejecting the attach, the UE may receive an attach reject message. The network sends the attach reject message and includes an EPS mobility management (EMM) cause value in the attach reject message. If the UE determines or detects that the one or more PDU sessions includes an emergency PDU session, or the UE receives the attach reject message or depending on the (EMM) cause value in the attach reject message, the UE performs an attach for emergency bearer services with a second network. The attach request sent by the UE due to the attach for emergency bearer services includes a PDN CONNECTIVITY REQUEST message requesting to activate the default bearer corresponding to a default EPS bearer context for the emergency PDU session (i.e. a first PDN CONNECTIVITY REQUEST message), and the request type of the PDN CONNECTIVITY REQUEST is set to "handover of emergency bearer services". The network may accept the attach request sent by the UE due to the attach for emergency bearer services and the included request to activate the default bearer corresponding to a default EPS bearer context for the emergency PDU session. Optionally, the attach request sent by the UE due to the attach procedure also included the PDN CONNECTIVITY REQUEST message, which may have the request type set to "handover of emergency bearer services". The first and the second network are each part of a public land mobile network (PLMN). The second PLMN can be either the first PLMN or a PLMN considered equivalent to the first PLMN or the second PLMN is neither the first PLMN nor considered equivalent. PLMNs are equivalent when their PLMN identities are present in an equivalent PLMN list. The UE may be configured with the equivalent PLMN list.

A PLMN can comprise for example a 5GC+access network, or an EPC+access network, or an 5GC+access network and an EPC+access network. A PLMN operator operates one or more core networks+access networks.

In a first enhancement of the first embodiment, performing the attach for emergency bearer services with the second network is subject to the lower layers of the UE or access stratum (AS) layer of the UE indicating to the NAS (or NAS layer of the UE) that the network supports emergency bearer services in limited service state. Alternatively, performing the attach procedure with a network including the EPC is subject to the lower layers of the UE or AS layer of the UE having indicated to the NAS (or NAS layer of the UE) that the first network supports emergency bearer services in limited service state.

In a second enhancement of the first embodiment, the UE performs the attach for emergency bearer services with the second network if the EMM cause value in the attach rejection message from the first network is different from one or more predefined EMM cause values. The one or more predefined EMM cause values includes, for example, #5 "IMEI not accepted". If the EMM cause value is not different from one or more predefined EMM cause values, the UE performs one of 1) entering the state EMM-DEREGISTERED.NO-IMSI; or 2) attempting an attach on a second network, the second network different from the first network from which the EMM cause value was received. The first and the second network are each part of a public land mobile network (PLMN). The second PLMN can be either the first PLMN or a PLMN considered equivalent to the first PLMN or the second PLMN is neither the first PLMN nor considered equivalent. PLMNs are equivalent when their PLMN identities are present in an equivalent PLMN list. The UE may be configured with the equivalent PLMN list. The first network may set the EMM cause value to one of the one or more predefined EMM cause values, if the attach request sent by the UE due to the attach procedure included the first PDN CONNECTIVITY REQUEST.

In a third enhancement of the first embodiment, in a shared network, a UE can attempt to register to one of multiple PLMNs of the shared network. In the shared network, when the UE receives the attach reject message and prior to performing the attach for emergency bearer services, the UE performs an attach procedure with another PLMN including an EPC, the another PLMN is one of the multiple PLMNs of the shared network. The another PLMN may be equivalent to the PLMN from which the EMM cause value was received.

In a fourth enhancement of the first embodiment, the UE shall not request use of power saving mode (PSM) or the use of cellular internet of things (CIoT) optimization when performing the attach procedure with the network including the EPC. The use of PSM or CIoT optimizations may have an adverse effect on the emergency call. This adverse effect may put the user of the UE at peril. The UE shall not request use of PSM or the use of CIoT optimization when performing the attach procedure with the network including the EPC, and the UE detects the one or more PDU sessions includes an emergency PDU session. The UE shall not request use of PSM or the use of CIoT optimization when performing the attach procedure with the network including the EPC, and the attach request sent by the UE due to the attach procedure included the PDN CONNECTIVITY REQUEST message.

In a fifth enhancement of the first embodiment, the UE detects it receives an EMM cause code set to #19 indicating EPS Session Management (ESM) failure. An ESM failure indicates that the network detected a failure when inspecting or handling a PDN CONNECTIVITY REQUEST message included in the first attach request message. Based on the detecting, instead of first performing attach for emergency bearer services with the second network (as described in the first embodiment), the UE performs another attach procedure with a network including an EPC. The network including the EPC may be equivalent to the first network. The UE sends an attach request message due to the another attach procedure, this attach request message includes the first PDN CONNECTIVITY REQUEST message.

In the event the another attach procedure fails, the UE may perform the attach for emergency bearer services with the second network and continue as described in the first embodiment.

Figure 2:
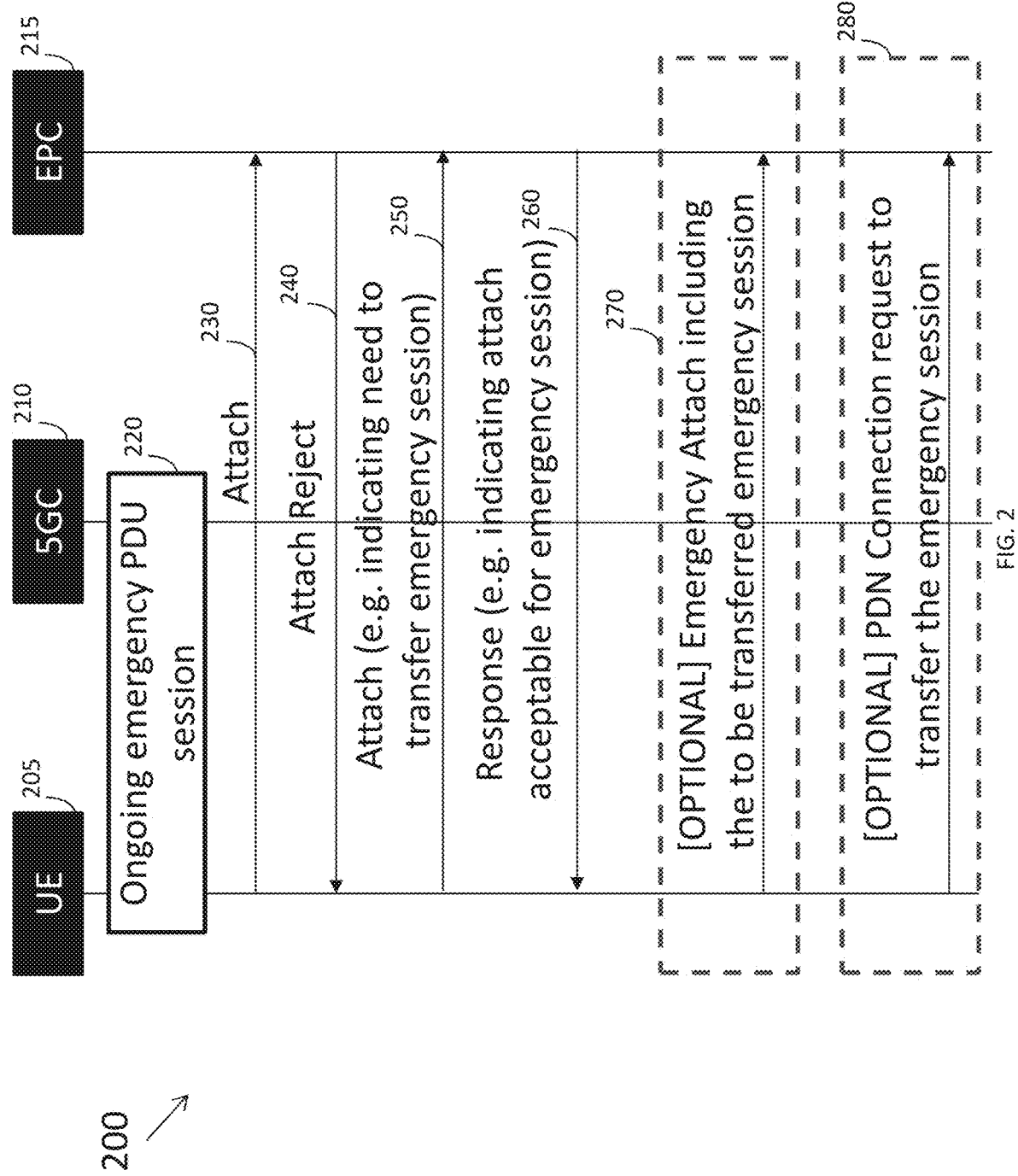
FIG. 2 is a message flow diagram of an embodiment of preserving an emergency call during handover from 5GC to EPC.

FIG. 2 a message flow diagram 200 of an embodiment of preserving an emergency call during handover from 5GC to EPC. During an ongoing emergency PDU session 220 between the UE 205 and a 5GC 210, the UE 205 may determine to handover to an EPC 215. The UE 205 sends an attach message to the EPC 215 at step 230 and receives an attach reject message from the EPC 215 at step 240. The attach may be rejected for various reasons, for example the EPC 215 may be overloaded. In response to the attach reject, the UE 205 may determine or detect there is an ongoing emergency call. In response to determining the ongoing emergency call, the UE 205 may submit a second attach message indicating the need to transfer the emergency session at step 250. The EPC 215 may then reply with a response indicating that the second attach is acceptable at step 260 or not acceptable (the figure does not show the second attach not being acceptable). The second attach may include a PDN connection request from the UE 205 to the EPC 215 to transfer the emergency session. Upon receipt of an ACTIVATE DEFAULT EPS BEARER CONTEXT REQUEST message by the UE 205, the transfer of the emergency session for the ongoing emergency call has been successful. Optionally at step 270, if the second attach was not acceptable, the UE 205 may transmit an emergency attach including a request to transfer the connectivity provided by the ongoing emergency PDU session. Another optional transmission, if response 260 is received, at step 280 may be a PDN connection request from the UE 205 to the EPC 215 to transfer the emergency session. The second attach message may be an emergency attach message.

In a second embodiment, when the UE has one or more PDN connections to transfer from EPS to 5GS, the UE performs a(n initial) registration procedure with a first network including the 5GC, and the 5GC network may reject a registration request sent by the UE due to the registration procedure. The 5GC network sends a registration reject message to the UE. The 5GC network includes an 5GMM cause value in the registration reject message. The UE receives the registration reject message. If the UE determines that the one or more PDN connections includes a PDN connection for emergency bearer services, and the UE receives the registration reject message, the UE performs a registration for emergency services with a second network. The UE sends a registration request message for emergency services to the second network. If the second network accepts the registration request for emergency services, the second network sends a registration accept message to the UE. When the UE receives the registration accept message, the UE transfers the PDN connection for emergency bearer services by sending a PDU session request message with request type set to "existing emergency PDU session". When the UE sends the registration request, the UE includes the Follow-on request indicator set to "Follow-on request pending" in the registration request. The first and the second network are each part of a PLMN. The second PLMN can be either the first PLMN or a PLMN considered equivalent to the first PLMN or the second PLMN is neither the first PLMN nor considered equivalent. PLMNs are equivalent when their PLMN identities are present in an equivalent PLMN list. The UE may be configured with the equivalent PLMN list.

A PLMN can comprise for example a 5GC+access network, or an EPC+access network, or an 5GC+access network and an EPC+access network. A PLMN operator operates one or more core networks+access networks. In a first enhancement of the second embodiment, performing the registration for emergency services with the second network is subject to the lower layers of the UE or AS layer of the UE indicating to the NAS (or NAS layer of the UE) that the network supports emergency bearer services in limited service state. Alternatively, performing registration procedure with a network including the 5GC is subject to the lower layers of the UE or AS layer of the UE having indicated to the NAS (or NAS layer of the UE) that the first network supports emergency bearer services in limited service state, if the one or more PDN connections includes a PDN connection for emergency bearer services.

In a second enhancement of the second embodiment, the UE performs the registration for emergency services with the second network if the 5GMM cause value is different from one or more predefined 5GMM cause values. The one or more predefined 5GMM cause values includes, for example, #5 "PEI not accepted". If the 5GMM cause value is not different from one or more predefined 5GMM cause values, the UE performs one of 1) entering the state 5GMM-DEREGISTERED.NO-SUPI; or 2) attempting a registration on a third network, the third network different from the first network from which the 5GMM cause value was received. The first and the third network are each part of a public land mobile network (PLMN). The third PLMN can be a PLMN considered equivalent to the first PLMN. PLMNs are equivalent when their PLMN identities are present in an equivalent PLMN list. The UE may be configured with the equivalent PLMN list. The network may set the 5GMM cause value to one of the one or more predefined 5GMM cause values, if the registration request sent by the UE due to the registration procedure included an indication indicating the UE needs to transfer an emergency session. The UE can indicate it needs to transfer an emergency session by indicating using the 5GS registration type that the registration request is a registration request for transfer of an emergency session.

In a third enhancement of the second embodiment, in a shared network, a UE can attempt to register to one of multiple PLMNs of the shared network. In the shared network, when the UE receives the registration reject message and prior to performing the registration for emergency bearer services, the UE performs a registration procedure with a fourth PLMN including a 5GC, the fourth PLMN is one of the multiple PLMNs of the shared network. The fourth PLMN may be equivalent to the PLMN from which either the 5GMM cause value was received or the registration reject message was received.

In a fourth enhancement of the second embodiment, the UE shall not request use of PSM or the use of CIoT optimization when performing the registration procedure with the network including the 5GC. The UE shall not request use of PSM or the use of CIoT optimization when performing the registration procedure with the network including the 5GC, and the UE detects the one or more PDU sessions includes an emergency PDU session. The UE shall not request use of PSM or the use of CIoT optimization when performing the registration procedure with the network including the 5GC, and the registration request sent by the UE due to the registration procedure included the indication indicating the UE needs to transfer an emergency session.

Figure 3:
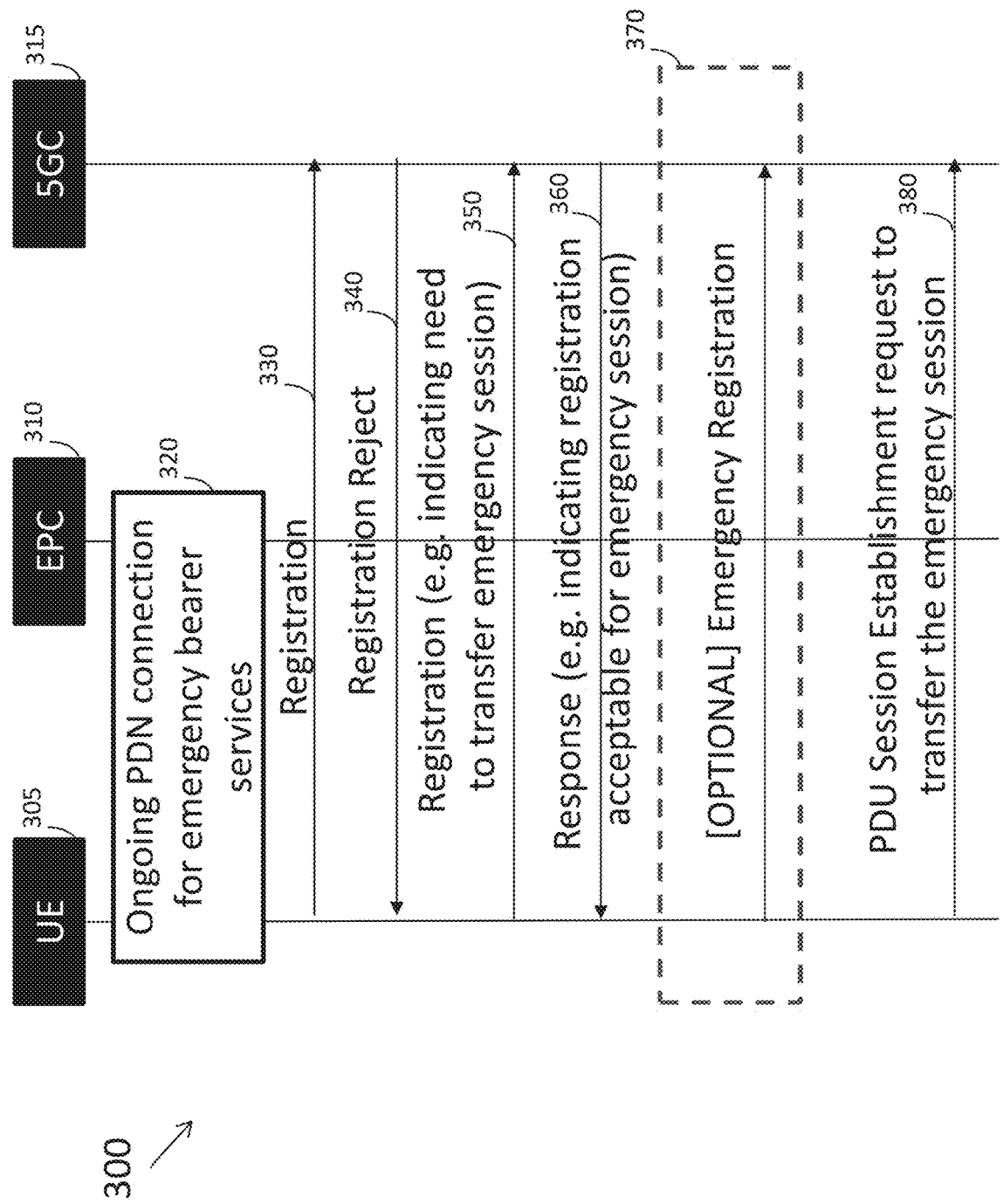
FIG. 3 is a message flow diagram of an embodiment of preserving an emergency call during handover from EPC to 5GC.

FIG. 3 is a message flow diagram 300 of an embodiment of preserving an emergency call during handover from EPC to 5GC. During an ongoing PDN connection for emergency bearer services 320 between the UE 305 and an EPC 310, the UE 305 may determine to handover to a 5GC 315. The UE 305 sends a registration message to the 5GC 315 at step 330 and receives a registration reject message from the 5GC 315 at step 340. The attach may be rejected for various reasons, for example the 5GC 315 may be overloaded. In response to the registration reject, the UE 305 may determine there is an ongoing emergency call and submit a second registration message due to the need to transfer the emergency session at step 350. The 5GC 315 may then reply with a response (to the second registration message) indicating that the registration is acceptable at step 360 or not acceptable (the figure does not show the second registration not being acceptable). Subsequent to receiving the response (to the second registration message) indicating that the registration is acceptable, the UE 305 transmits a PDU session establishment request from the UE 305 to the 5GC 315 to transfer the emergency session at step 380. The PDU session establishment request may include an indication that the emergency session is an existing emergency session. The indication may indicate that the existing emergency session is to be transferred. Optionally, at step 370, if the second registration was not acceptable, the UE may send an emergency registration. At step 380, the UE transfers the emergency session if either the second registration was not acceptable (360) or the emergency registration (370) was acceptable.

In a third embodiment, when the UE has one or more PDU sessions to transfer from 5GS to EPS, and the one or more PDU sessions include an emergency PDU session, the UE performs an attach procedure with a network including an EPC, the network may accept the attach request message sent by the UE due to the attach procedure. Due to the network accepting the attach, the UE may receive an attach accept message. The network sends the attach accept message and may include an indication that the attach is accepted for emergency services only. Because the UE receives indication that the attach is accepted for emergency services only, the UE refrains from transferring a non-emergency PDU session. If a PDN CONNECTIVITY REQUEST message requesting to activate a default bearer corresponding to a default EPS bearer context for an emergency PDU session was not included in the attach request message sent by the UE or a different PDN CONNECTIVITY REQUEST message was included in the attach request message sent by the UE, the UE may transmit a standalone PDN CONNECTIVITY REQUEST message requesting to activate a default bearer corresponding to a default EPS bearer context for an emergency PDU session. The standalone PDN CONNECTIVITY REQUEST message is sent subsequent to receiving the indication that the attach is accepted for emergency services only.

In a first enhancement of the third embodiment, the PDN CONNECTIVITY REQUEST message can be included in the attach request sent by the UE. In the alternative, the UE may include a different indication in the attach request, indicating that the UE intends to transfer an emergency PDU session (subsequent to sending the attach request). The UE may transfer the emergency PDU session subsequent to sending the attach request. The emergency PDU session is to be transferred by using a PDN CONNECTIVITY REQUEST message with the request type set to "handover of emergency bearer services". This PDN CONNECTIVITY REQUEST message is to be sent stand-alone. The network determines whether to include the indication that the attach is accepted for emergency services only in the attach accept message, for example, based on receipt of the indication indicating that the UE intends to transfer an emergency PDU session subsequent to sending the attach request.

Figure 4:
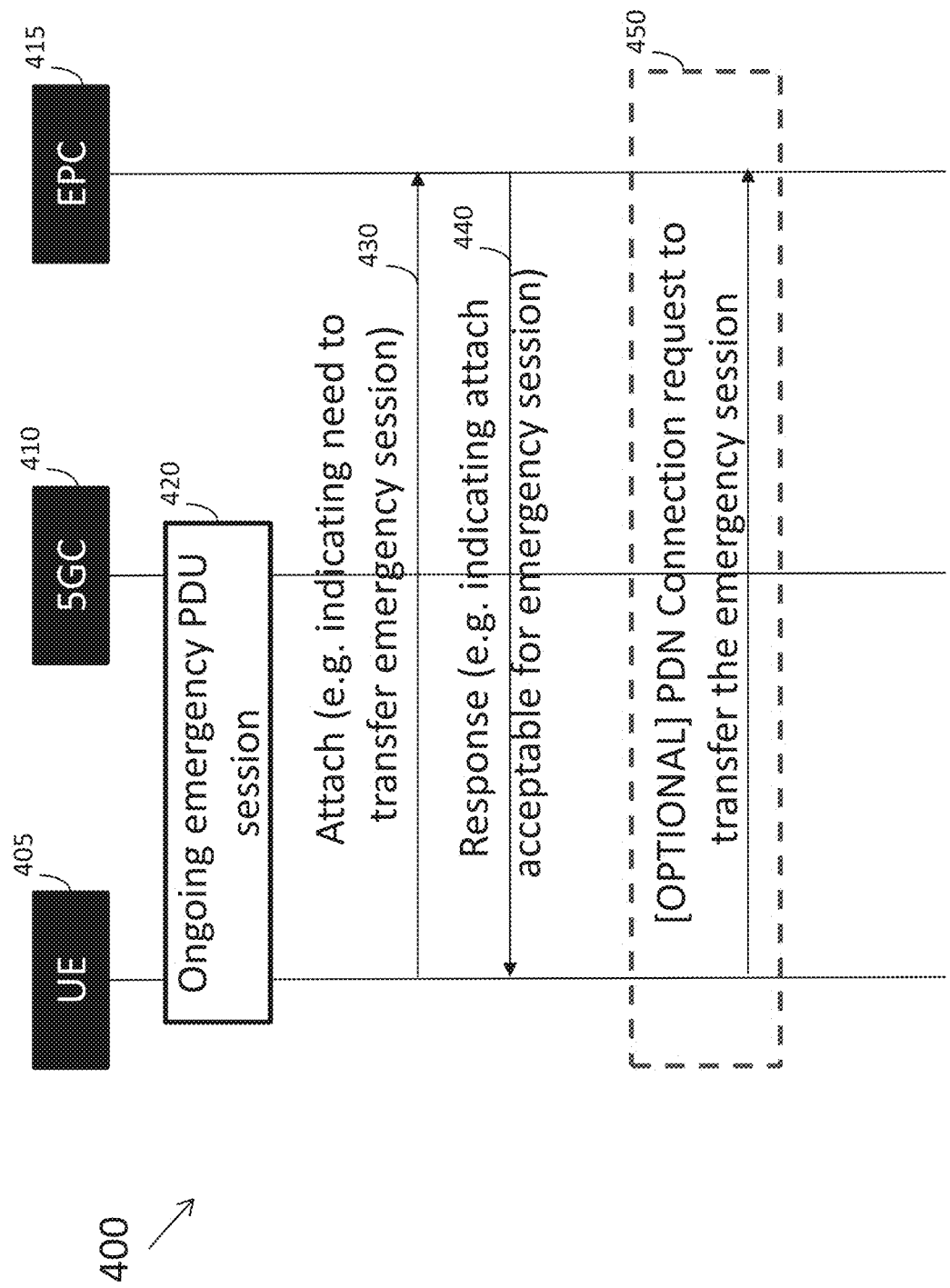
FIG. 4 is a message flow diagram of an embodiment of preserving an emergency call during handover from 5GC to EPC with reduced messaging.

FIG. 4 is a message flow diagram 400 of an embodiment of preserving an emergency call during handover from 5GC to EPC with reduced messaging. During an ongoing emergency PDU session 420 between the UE 405 and 5GC 410, the UE 405 may determine to handover to an EPC 415. The UE 405 may send an attach message indicating the need to transfer the emergency session to the EPC 415 at step 430. The EPC 415 may send a response indicating attach acceptance for the emergency session at step 440. Optionally, in response to the attach acceptance for the emergency session, at step 450 the UE 405 may transmit a PDN connection request to the EPC 415 to transfer the emergency session.

In a fourth embodiment, when the UE has one or more PDN connections sessions to transfer from EPS to 5GS, and the one or more PDN connections sessions include a PDN connections session for emergency bearer services, the UE performs a registration procedure with a network including a 5GC, the network may accept the registration message sent by the UE due to the registration procedure. Due to the network accepting the registration, the UE may receive a registration accept message. The network sends the registration accept message and may include an indication that the registration is accepted for emergency services only. Because the UE receives indication that the registration is accepted for emergency services only, the UE refrains from transferring a non-emergency PDN connection. A PDU SESSION ESTABLISHMENT REQUEST message corresponding to a default EPS bearer context of a PDN connection for emergency bearer services is sent subsequent to receiving the indication that the registration is accepted for emergency services only.

In a first enhancement of the fourth embodiment, the UE may include an indication in the registration request, indicating that the UE intends to transfer a PDN connection for emergency bearer services. The UE transfers the PDN connection for emergency bearer services subsequent to sending the registration request. The PDN connection for emergency bearer services is to be transferred by using a PDU SESSION ESTBLISHMENT REQUEST message with the request type set to "existing emergency PDU session". The network determines whether to include the indication that the registration is accepted for emergency services only in the registration accept message for example based on receipt of the indication indicating that the UE intends to transfer a PDN connection for emergency bearer services.

Figure 5:
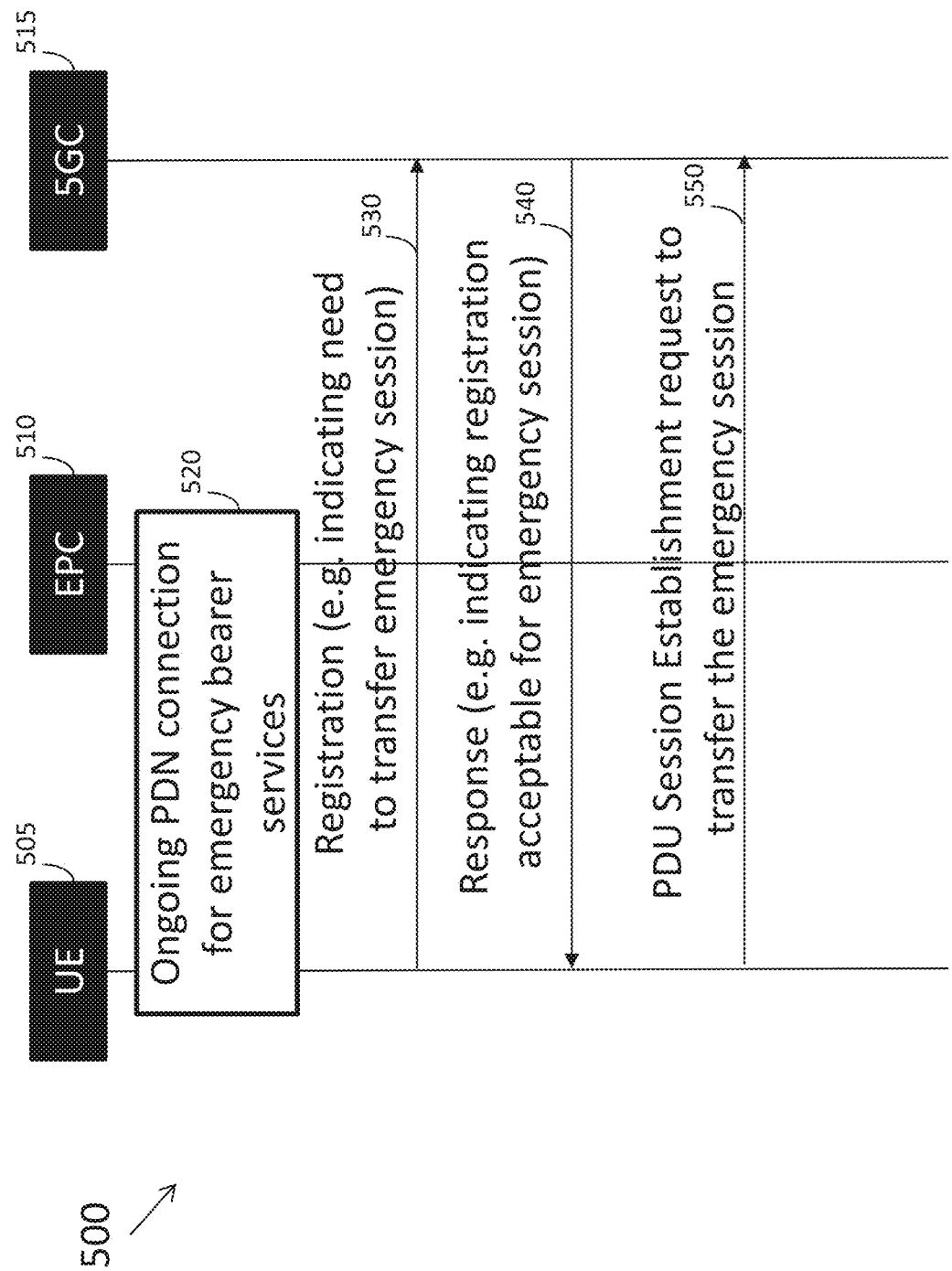
FIG. 5 is a message flow diagram of an embodiment of preserving an emergency call during handover from EPC to 5GC with reduced messaging.

FIG. 5 is a message flow diagram 500 of an embodiment of preserving an emergency call during handover from EPC to 5GC with reduced messaging. During an ongoing PDN connection 520 for emergency bearer services between the UE 505 and an EPC 510, the UE 505 may determine to handover to an 5GC 515. The UE 505 sends a registration message indicating the need to transfer the emergency session at step 530. 280 The 5GC 515 may then reply with a response indicating that the registration is acceptable for the emergency session at step 540. At step 550, in response to the registration acceptance for the emergency session, the UE 505 may transmit a PDU session establishment request to the 5GC 515 to transfer the emergency session.

In a fifth embodiment, preserving an emergency call during handover from 5GC to EPC with reduced messaging is achieved as follows. During an ongoing emergency PDU session between the UE and 5GC, the UE may determine to handover to an EPC. The UE may have one or more additional PDU sessions to transfer from 5GS to EPS. The UE may send an emergency attach message indicating the emergency session to be transferred to the EPC. The EPC may send a response indicating attach acceptance. The EPC may indicate in the message indicating that the attach is accepted for non-emergency use also. The EPC may decide to indicate that the attach is accepted for non-emergency use based on the received indication indicating an emergency session is to be transferred. Optionally, the UE may proceed and transfer any of the one or more additional PDU sessions due receiving the message indicating that the attach is accepted for non-emergency use.

In a sixth embodiment, preserving an emergency call during handover from EPC to 5GC with reduced messaging is achieved as follows. During ongoing use of an PDN connection for emergency bearer services between the UE and 5GC, the UE may determine to handover to an 5GC. The UE may have one or more additional PDN connections sessions to transfer from EPS to 5GS. The UE may send an emergency registration message. The 5GC may send a response indicating registration acceptance. The 5GC may indicate in the message indicating that the registration is accepted for non-emergency use also. Based on receiving, at the UE, the message indicating that the registration is accepted for non-emergency use also, the UE may proceed and transfer any of the one or more additional PDN connections sessions, in addition to transferring the PDN connection for emergency bearer services.

In an enhancement of the sixth embodiment, preserving an emergency call during handover from EPC to 5GC with reduced messaging is achieved as follows. The UE may indicate in the emergency registration message that an existing emergency session is to be transferred or that an emergency session exists. The 5GC may decide to indicate that the registration is accepted for non-emergency use based on the received indication indicating that an existing emergency session is to be transferred or that an emergency session exists.

In a seventh embodiment, the UE shall not request use of PSM or the use of CIoT optimization when performing an attach procedure with a network including an EPC and due to transferring a certain type of PDU session among one or more PDU sessions to EPC. The use of PSM or CIoT optimizations may have an adverse effect on the emergency call. This adverse effect may put the user of the UE at peril. In particular, the UE shall not request use of PSM or the use of CIoT optimization when performing the attach procedure with the network including the EPC and the UE detects the one or more PDU sessions includes an emergency PDU session. The UE shall not request use of PSM or the use of CIoT optimization when performing the attach procedure with the network including the EPC and an attach request sent by the UE due to the attach procedure is intended to be followed with the first PDN CONNECTIVITY REQUEST message. I.e. the first PDN CONNECTIVITY REQUEST message is to be sent stand-alone. I.e. the attach message does not include a PDN CONNECTIVITY REQUEST message with request type set to "handover of emergency bearer services".

In an eighth embodiment, preserving an emergency call during handover from a source core network to a target core network comprises verifying, by the UE, whether the target network supports handover of existing emergency sessions. The target core network may comprise one of an EPC or a 5GC. Verifying whether the target network supports handover comprises sending an indication that the UE supports Request Type flag "handover" for PDN connectivity request during the attach procedure, if the target core network is the EPC. Verifying whether the target network supports handover comprises a verification performed during the Registration and Registration Update, if the target core network is the 5GC. If the UE determines the target core network does not support handover, the UE selects another PLMN, the other PLMN being an equivalent PLMN, or the UE attempts transfer of the emergency call to another Internet Protocol-Connectivity Access Network (IP-CAN). An IP-CAN is an access network that provides IP connectivity. Or the UE attempts transfer of the emergency call to the circuit-switched domain.

A UE in dual registration mode and concurrently attached or registered in both EPC and 5GS and detecting or establishing an active emergency session in one of the two systems, updates its registration information in the other of the two systems. The UE updates its registration information in the other of the two systems in anticipation of a potential transfer of the active emergency session to the other of the two systems. The updating of the registration information comprises disabling the use of PSM or disabling the use of CIoT optimizations. The updating of the registration information comprises performing, depending on whether the other system is EPS or 5GS, one of a registration update or a tracking area update. Performing one of the one of a registration update or a tracking area update, comprises sending a NAS message to the core network. Performing of the registration update comprises sending a REGISTRATION REQUEST message to the 5GC. The performing of the tracking area update comprises sending a TRACKING AREA UPDATE REQUEST message to the EPC.

The several embodiments described above may be combined depending upon the networks and/or the UE. Further, certain steps may be omitted from embodiments if not required for handing over an emergency call.

FIG. 6 is a proposed change 600 to 3GPP TS24.301 section 5.3.11. Proposed deletions are indicated by strikethrough text and proposed additions are indicated by underlined text. The proposed changes may enable the various embodiments of preserving emergency calls described herein.

The UE can request the use of power saving mode (PSM) during an attach or tracking area updating procedure. The UE shall not request the use of PSM during:
 an attach for emergency bearer services procedure; or
 an attach procedure with attach type not set to "EPS emergency attach" and:
 a) for initiating a PDN connection for emergency bearer services; or
 b) for transmission of a PDN CONNECTIVITY REQUEST message with request type set to "handover" while the UE intends to transmit a standalone PDN CONNECTIVITY REQUEST message with request type set to "handover of emergency bearer services";
  a tracking area updating procedure for initiating a PDN connection for emergency bearer services;
  a tracking area updating procedure when the UE has a PDN connection established for emergency bearer services; or
 an attach for access to RLOS.

FIG. 7 is a proposed change 700 to 3GPP TS24.301 section 5.3.15. Proposed deletions are indicated by strikethrough text and proposed additions are indicated by underlined text. The proposed changes may enable the various embodiments of preserving emergency calls described herein.

In NB-S1 mode, the UE, when requesting the use of CIoT EPS optimization, does not:
 request an attach for emergency bearer services procedure;
 request an attach procedure with attach type not set to "EPS emergency attach"; and
 a) for initiating a PDN connection for emergency bearer services; or
 b) for transmission of a PDN CONNECTIVITY REQUEST message with request type set to "handover" while the UE intends to transmit a standalone PDN CONNECTIVITY REQUEST message with request type set to "handover of emergency bearer services";
 indicate voice domain preference and UE's usage setting; or
 request an attach for access to RLOS.

FIG. 8 is a proposed change 800 to 3GPP TS24.301 section 5.5.1.2.5A. Proposed deletions are indicated by strikethrough text and proposed additions are indicated by underlined text. The proposed changes may enable the various embodiments of preserving emergency calls described herein.

If the attach request for emergency bearer services fails or is rejected due to receiving an ATTACH REJECT, and the UE proceeds to inform the upper layers of the failure to access the network.

NOTE, informing the upper layers can result in the upper layers requesting establishment of a CS emergency call (if not already attempted in the CS domain), transfer to non-3GPP access, or other implementation specific mechanisms, e.g. procedures specified in 3GPP TS 24.229 can result in the emergency call being attempted or transferred to another IP-CAN. . . .

In a shared network, upon receiving the ATTACH REJECT message, the UE shall perform the actions as described in subclause 5.5.1.2.5, and shall:
 a) inform the upper layers of the failure of the procedure; or
 b) attempt the attach for emergency bearer services to another PLMN in the shared network, if the ATTACH REQUEST message did not include a PDN CONNECTIVITY REQUEST message with request type set to "handover of emergency bearer services" or the ATTACH REQUEST message did include a PDN CONNECTIVITY REQUEST message with request type set to "handover of emergency bearer services" and the other PLMN is an equivalent PLMN.

In a shared network, if the attach request for emergency bearer services fails due to abnormal case a) in subclause 5.5.1.2.6, the UE shall perform the actions as described in subclause 5.5.1.2.6 and shall:
 a) inform the upper layers of the failure to access the network; or
 b) attempt the attach for emergency bearer services to another PLMN in the shared network, if the ATTACH REQUEST message did not include a PDN CONNECTIVITY REQUEST message with request type set to "handover of emergency bearer services" or the ATTACH REQUEST message did include a PDN CONNECTIVITY REQUEST message with request type set to "handover of emergency bearer services" and the other PLMN is an equivalent PLMN.

In a shared network, if the attach request for emergency bearer services fails due to abnormal cases b), c) or d) in subclause 5.5.1.2.6, the UE shall perform the actions as described in subclause 5.5.1.2.6, and shall:
 a) inform the upper layers of the failure of the procedure; or
 b) attempt the attach for emergency bearer services to another PLMN in the shared network, if the ATTACH REQUEST message did not include a PDN CONNECTIVITY REQUEST message with request type set to "handover of emergency bearer services" or the ATTACH REQUEST message did include a PDN CONNECTIVITY REQUEST message with request type set to "handover of emergency bearer services" and the other PLMN is an equivalent PLMN.

FIG. 9 is a proposed change 900 to 3GPP TS24.301 section 5.5.1.2.5B. Proposed deletions are indicated by strikethrough text and proposed additions are indicated by underlined text. The proposed changes may enable the various embodiments of preserving emergency calls described herein.

If the network cannot accept attach request including a PDN CONNECTIVITY REQUEST message with request type set to "emergency" and with attach type not set to "EPS emergency attach", the UE shall perform the procedures as described in subclause 5.5.1.2.5. Then if the UE is in the same selected PLMN where the last attach request was attempted, the UE shall:

a) inform the upper layers of the failure of the procedure; or b) attempt EPS attach for emergency bearer services including the PDN CONNECTIVITY REQUEST message.

If the network cannot accept attach request including a PDN CONNECTIVITY REQUEST message with request type set to "handover of emergency bearer services" and with attach type not set to "EPS emergency attach", the UE shall perform the procedures as described in subclause 5.5.1.2.5. Then if the UE is in the same selected PLMN or equivalent PLMN where the last attach request was attempted, the UE shall attempt EPS attach for emergency bearer services including the PDN CONNECTIVITY REQUEST message.

If the attach request for initiating a PDN connection for emergency bearer services with attach type not set to "EPS emergency attach" fails due to abnormal case a) in subclause 5.5.1.2.6, the UE shall perform the actions as described in subclause 5.5.1.2.6 and inform the upper layers of the failure to access the network.

If the attach request including a PDN CONNECTIVITY REQUEST message with request type set to "emergency" and with attach type not set to "EPS emergency attach" fails due to abnormal cases b), c) or d) in subclause 5.5.1.2.6, the UE shall perform the procedures as described in subclause 5.5.1.2.6. Then if the UE is in the same selected PLMN where the last attach request was attempted, the UE shall:

a) inform the upper layers of the failure of the procedure; or b) attempt EPS attach for emergency bearer services including the PDN CONNECTIVITY REQUEST message.

If the attach request for initiating a PDN connection for emergency bearer services with attach type not set to "EPS emergency attach" fails due to abnormal cases b), c), d) or o) in subclause 5.5.1.2.6, the UE shall perform the procedures as described in subclause 5.5.1.2.6. Then if the UE is in the same selected PLMN or equivalent PLMN where the last attach request was attempted, the UE shall attempt EPS attach for emergency bearer services including the PDN CONNECTIVITY REQUEST message.

FIG. 10 is a proposed change 1000 to 3GPP TS24.301 section 5.5.1.2.5B1. Proposed deletions are indicated by strikethrough text and proposed additions are indicated by underlined text. The proposed changes may enable the various embodiments of preserving emergency calls described herein.

If the network cannot accept attach request including a PDN CONNECTIVITY REQUEST message with request type set to "handover" and the UE also intends to transfer an emergency PDU session, the UE shall attempt EPS attach for emergency bearer services including a PDN CONNECTIVITY REQUEST message with request type set to "handover of emergency bearer services" for the emergency PDU session.

If the attach request, including a PDN CONNECTIVITY REQUEST message with request type set "handover", fails due to abnormal case a) in subclause 5.5.1.2.6 and the UE intends to transfer an emergency PDU session, the UE shall attempt EPS attach including a PDN CONNECTIVITY REQUEST message with request type set to "handover of emergency bearer services" for the emergency PDU session.

If the attach request including a PDN CONNECTIVITY REQUEST message with request type set "handover" fails due to abnormal cases b), c), d) or o) in subclause 5.5.1.2.6, the UE intends to transfer an emergency PDU session, if the EMM cause set to #19 "ESM failure" is received, the UE shall attempt EPS attach with the ATTACH REQUEST message including a PDN CONNECTIVITY REQUEST message with request type set to "handover of emergency bearer services" for the emergency PDU session; and otherwise, the UE shall attempt EPS attach for emergency bearer services with the ATTACH REQUEST message including a PDN CONNECTIVITY REQUEST message with request type set to "handover of emergency bearer services" for the emergency PDU session.

FIGS. 11A and 11B are a proposed change 1100 to 3GPP TS24.301 section 5.5.1.2.6. Proposed deletions are indicated by strikethrough text and proposed additions are indicated by underlined text. The proposed changes may enable the various embodiments of preserving emergency calls described herein.

The following abnormal cases can be identified:

a) access barred because of access class barring, EAB, ACDC or NAS signalling connection establishment rejected by the network without "Extended wait time" received from lower layers.

In WB-S1 mode, if access is barred for "originating signalling", the attach procedure shall not be started. The UE stays in the current serving cell and applies the normal cell reselection process. The attach procedure is started as soon as possible, i.e. when access for "originating signalling" is granted on the current cell or when the UE moves to a cell where access for "originating signalling" is granted . . .

b) Lower layer failure or release of the NAS signalling connection without "Extended wait time" and without "Extended wait time CP data" received from lower layers before the ATTACH ACCEPT or ATTACH REJECT message is received;

the attach procedure shall be aborted, and the UE shall proceed as described below.

c) T3410 timeout.

The UE shall abort the attach procedure and proceed as described below. The NAS signalling connection, if any, shall be released locally.

d) ATTACH REJECT, other EMM cause values than those treated in subclause 5.5.1.2.5, and cases of EMM cause values #22, #25 and #31, if considered as abnormal cases according to subclause 5.5.1.2.5.

Upon reception of the EMM cause #19 "ESM failure", if the UE is not configured for NAS signalling low priority and the ESM cause value received in the PDN CONNECTIVITY REJECT message is not #54 "PDN connection does not exist", the UE may set the attach attempt counter to 5. Subsequently, if the UE needs to retransmit the ATTACH REQUEST message to request PDN connectivity towards a different APN, the UE may stop T3411 or T3402, if running, and send the ATTACH REQUEST message. If the UE needs to attempt EPS attach to request transfer of a PDN connection for emergency bearer services by including a PDN CONNECTIVITY REQUEST message with request type set to "handover of emergency bearer services", the UE shall stop T3411 or T3402, if running, and send the ATTACH REQUEST message.

NOTE 3. When receiving EMM cause #19 "ESM failure", coordination is required between the EMM and ESM sublayers in the UE to determine whether to set the attach attempt counter to 5.

If the attach request is neither for emergency bearer services nor for initiating a PDN connection for emergency bearer services with attach type not set to "EPS emergency attach", upon reception of the EMM causes #95, #96, #97, #99 and #111 the UE should set the attach attempt counter to 5.

The UE shall proceed as described below . . .
o) Timer T3447 is running.
The UE shall not start the attach procedure unless:
the UE is a UE configured to use AC11-15 in selected PLMN;
the UE attempts to attach for emergency bearer services; or
the UE attempts to attach without PDN connection request.

The UE stays in the current serving cell and applies the normal cell reselection process. The attach request procedure is started, if still necessary, when timer T3447 expires.

For the cases b, c, d, l, la and m, Timer T3410 shall be stopped if still running. For the cases b, c, d, l when the "Extended wait time" is ignored, and la when the "Extended wait time CP data" is ignored, if the attach request is neither for emergency bearer services nor for initiating a PDN connection for emergency bearer services with attach type not set to "EPS emergency attach", the attach attempt counter shall be incremented, unless it was already set to 5.

If the attach attempt counter is less than 5 . . .
for the cases b, c, d, l when the "Extended wait time" is ignored, and la when the "Extended wait time CP data" is ignore, if the attach request is neither for emergency bearer services nor for initiating a PDN connection for emergency bearer services with attach type not set to "EPS emergency attach", timer T3411 is started and the state is changed to EMM-DEREGISTERED.ATTEMPTING-TO-ATTACH.
When timer T3411 expires the attach procedure shall be restarted, if still required by ESM sublayer.

FIG. 12 is another proposed change 1200 to 3GPP TS24.501 section 5.5.1.2.6. Proposed deletions are indicated by strikethrough text and proposed additions are indicated by underlined text. The proposed changes may enable the various embodiments of preserving emergency calls described herein.

Upon receiving the REGISTRATION REJECT message or the registration request fails, the UE shall perform the actions as described in subclause 5.5.1.2.5 with the following addition:
the UE shall inform the upper layers of the failure of the procedure.

NOTE, this can result in the upper layers requesting transfer to non-3GPP access or implementation specific mechanisms, e.g. procedures specified in 3GPP TS 24.229 can result in the emergency call being attempted to another IP-CAN . . .

In a shared network, upon receiving the REGISTRATION REJECT message, the UE shall perform the actions as described in subclause 5.5.1.2.5, and shall:
a) inform the upper layers of the failure of the procedure; or
b) attempt to perform a PLMN selection in the shared network and initiate an initial registration for emergency services to the selected PLMN, if the REGISTRATION REQUEST message is not for sending a PDU SESSION ESTABLISMENT message with request type set to "existing emergency PDU session" or the REGISTRATION REQUEST message is for sending a PDU SESSION ESTABLISMENT message with request type set to "existing emergency PDU session" and the other PLMN is an equivalent PLMN.

In a shared network, if the initial registration request for emergency services fails due to abnormal cases, the UE shall perform the actions as described in subclause 5.5.1.2.7 and shall:
a) inform the upper layers of the failure of the procedure; or
b) attempt the initial registration for emergency services to another PLMN in the shared network, if the REGISTRATION REQUEST message is not for sending a PDU SESSION ESTABLISMENT message with request type set to "existing emergency PDU session" or the REGISTRATION REQUEST message is for sending a PDU SESSION ESTABLISMENT message with request type set to "existing emergency PDU session" and the other PLMN is an equivalent PLMN.

FIG. 13 is a proposed change 1300 to 3GPP TS24.501 section 5.5.1.2.6A. Proposed deletions are indicated by strikethrough text and proposed additions are indicated by underlined text. The proposed changes may enable the various embodiments of preserving emergency calls described herein.

If the network cannot accept initial registration request for sending a PDU SESSION ESTABLISHMENT message with request type set to "initial emergency request" with 5GS registration type IE set to "initial registration", the UE shall perform the procedures as described in subclause 5.5.1.2.5. Then if the UE is in the same selected PLMN where the last initial registration request was attempted, the UE shall:
a) inform the upper layers of the failure of the procedure; or
b) attempt initial registration for emergency services.

If the network cannot accept initial registration request for initiating a PDU session for emergency services with 5GS registration type IE set to "initial registration" and the PDU session needs to be established due to handover of an existing PDN connection for emergency bearer services, the UE shall perform the procedures as described in subclause 5.5.1.2.5. Then if the UE is in the same selected PLMN or equivalent PLMN where the last initial registration request was attempted, the UE shall attempt initial registration for emergency services.

If the initial registration request for initiating a PDU session for emergency services with 5GS registration type IE set to "initial registration" fails due to abnormal cases c), d) or e) in subclause 5.5.1.2.7 and the PDU session does not need to be established due to handover of an existing PDN connection for emergency bearer services, the UE shall perform the actions as described in subclause 5.5.1.2.7. Then if the UE is in the same selected PLMN where the last initial registration request was attempted, the UE shall:
a) inform the upper layers of the failure of the procedure; or
b) attempt initial registration for emergency services.

If the initial registration request for initiating a PDU session for emergency services with 5GS registration type IE set to "initial registration" fails due to abnormal cases c), d) or e) in subclause 5.5.1.2.7 and the PDU session needs to be established due to handover of an existing PDN connection for emergency bearer services, the UE shall perform the procedures as described in subclause 5.5.1.2.7. Then if the UE is in the same selected PLMN or equivalent PLMN where the last initial registration request was attempted, the UE shall attempt initial registration for emergency services.

FIGS. 14A, 14B, and 14C are a proposed change 1400 to 3GPP TS25.301 section 5.5.1.2.7. Proposed deletions are indicated by strikethrough text and proposed additions are indicated by underlined text. The proposed changes may enable the various embodiments of preserving emergency calls described herein.

The following abnormal cases can be identified:

a) Timer T3346 is running.

The UE shall not start the registration procedure for initial registration unless:

1) the UE is a UE configured for high priority access in selected PLMN;

2) the UE needs to perform the registration procedure for initial registration for emergency services;

3) the UE receives a DEREGISTRATION REQUEST message with the "re-registration required" indication; or 4) the UE in NB-N1 mode is requested by the upper layer to transmit user data related to an exceptional event; and:

the UE is allowed to use exception data reporting e.g. ExceptionDataReportingAllowed leaf of the NAS configuration Managed Object or the USIM file $EF_{NASCONFIG}$; and timer T3346 was not started when N1 NAS signalling connection was established with RRC establishment cause set to "mo-ExceptionData".

The UE stays in the current serving cell and applies the normal cell reselection process.

NOTE 1, it is considered an abnormal case if the UE needs to initiate a registration procedure for initial registration while timer T3346 is running independent on whether timer T3346 was started due to an abnormal case or a non-successful case.

b) The lower layers indicate that the access attempt is barred.

The UE shall not start the initial registration procedure. The UE stays in the current serving cell and applies the normal cell reselection process. Receipt of the access barred indication shall not trigger the selection of a different core network type (EPC or 5GCN).

The initial registration procedure is started, if still needed, when the lower layers indicate that the barring is alleviated for the access category with which the access attempt was associated.

ba) The lower layers indicate that access barring is applicable for all access categories except categories 0 and 2 and the access category with which the access attempt was associated is other than 0 and 2.

If the REGISTRATION REQUEST message has not been sent, the UE shall proceed as specified for case b. If the REGISTRATION REQUEST message has been sent, the UE shall proceed as specified for case e and, additionally, the registration procedure for initial registration is started, if still needed, when the lower layers indicate that the barring is alleviated for the access category with which the access attempt was associated.

c) T3510 timeout.

The UE shall abort the registration procedure for initial registration and the NAS signalling connection, if any, shall be released locally if the initial registration request is neither for emergency services nor for initiating a PDU session for emergency services with request type set to "existing emergency PDU session". The UE shall proceed as described below.

d) REGISTRATION REJECT message, other 5GMM cause values than those treated in subclause 5.5.1.2.5, and cases of 5GMM cause values #11, #22, #31, #72, #73, #74, #75, #76 and #77, if considered as abnormal cases according to subclause 5.5.1.2.5.

If the registration request is not an initial registration request for emergency services or an initial registration request for initiating a PDU session for emergency services with request type set to "existing emergency PDU session", upon reception of the 5GMM causes #95, #96, #97, #99 and #111 the UE should set the registration attempt counter to 5.

The UE shall proceed as described below.

e) . . .

l) Timer T3447 is running.

The UE shall not start the registration procedure for initial registration with Follow-on request indicator set to "Follow-on request pending" unless:

1) the UE is a UE configured for high priority access in selected PLMN; or 2) the UE needs to perform the registration procedure for initial registration for emergency services.

The UE stays in the current serving cell and applies the normal cell reselection process. The registration procedure for initial registration is started, if still necessary, when timer T3447 expires.

For the cases c, d and e, the UE shall proceed as follows:
Timer T3510 shall be stopped if still running.

If the registration procedure is neither an initial registration for emergency services nor for establishing an emergency PDU session with registration type not set to "emergency registration", the registration attempt counter shall be incremented, unless it was already set to 5.

If the registration attempt counter is less than 5, if the initial registration request is not for emergency services, timer T3511 is started and the state is changed to 5GMM-DEREGISTERED.ATTEMPTING-REGISTRATION. When timer T3511 expires the registration procedure for initial registration shall be restarted, if still required.

If the registration attempt counter is equal to 5:

the UE shall delete 5G-GUTI, TAI list, last visited registered TAI, list of equivalent PLMNs (if any), and ngKSI, start timer T3502 and shall set the 5GS update status to 5U2 NOT UPDATED. The state is changed to 5GMM-DEREGISTERED.ATTEMPTING-REGISTRATION or optionally to 5GMM-DEREGISTERED.PLMN-SEARCH in order to perform a PLMN selection.

If the procedure is performed via 3GPP access and the UE is operating in single-registration mode:

the UE shall in addition handle the EMM parameters EPS update status, EMM state, 4G-GUTI, TAI list, last visited registered TAI, list of equivalent PLMNs and eKSI as specified in 3GPP TS 24.301 for the abnormal cases when an EPS attach procedure fails and the attach attempt counter is equal to 5; and the UE shall attempt to select E-UTRAN radio access technology and proceed with appropriate EMM specific procedures. Additionally, The UE may disable the N1 mode capability as specified in subclause 4.9.

A procedure for a UE transferring one or more connections from a first access network connected to a first core network to a second access network connected to a second core network includes the UE performing a first registration procedure with the second core network and sending a registration request message; the UE receiving a registration reject message from the second core network; and the UE, subject to one or more conditions and subsequent to receiving the registration reject message, performing a second registration procedure with the second core network and sending one of an emergency registration request message or another registration request message, wherein one of the one or more conditions comprises detecting the emergency connection among the one or more connections.

In an embodiment, the registration comprises an attach.

In an embodiment, at least one of the attach request message, the another attach request message, and the emergency attach request message comprise a connection request message with information, the information comprising information corresponding to the emergency connection, and the connection request message comprising an emergency handover indication.

In an embodiment, the registration reject message comprises a cause code, wherein the cause code can be set to one of multiple cause codes and at least one of the of multiple cause codes indicating that one of an international mobile equipment identifier (IMEI) and a permanent equipment identifier (PEI) is not accepted.

In an embodiment, a second condition of the one or more conditions comprises detecting that the cause code is not set to indicate that one of an IMEI and a PEI is not accepted.

In an embodiment, upon detecting that the cause code is set to indicate one of an IMEI and a PEI is not accepted and determining the UE would need to provide one of an IMEI and a PEI as part of the emergency registration procedure, the UE, instead of performing the emergency attach procedure, entering one of the state EMM-DEREGISTERED.NO-IMSI and the state 5GMM-DEREGISTERED.NO-SUPI.

In an embodiment, a third condition of the one or more conditions comprises detecting that a timer is running.

A procedure for a UE transferring one or more connections from a first access network connected to a first core network to a second access network connected to a second core network includes the UE performing a first registration procedure with the second core network; the UE detecting a first condition, the first condition comprising one of access barred and NAS signalling connection establishment rejected by the second access network; the UE detecting a second condition, the second condition comprising whether there is an existing emergency connection among the one or more connections; and the UE, subject to the first and the second condition, performing a second registration procedure with the second core network and sending a registration request message.

If the second core network comprises an MME, the second registration request message comprises a request to transfer the existing emergency connection.

If the second core network comprises an AMF, the second registration request message comprises an emergency registration.

Figure 15:
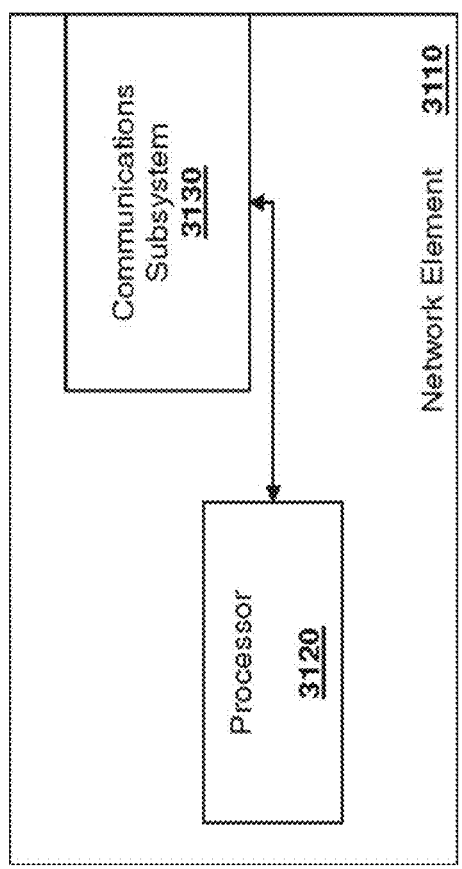
FIG. 15 is a diagram of an embodiment of a network element.

The various methods or operations described herein may be implemented by a network element. An example network element is shown with regard to FIG. 15. In FIG. 15, network element 3110 includes a processor 3120 and a communications subsystem 3130, where the processor 3120 and communications subsystem 3130 cooperate to perform the methods or operations previously described.

Figure 16:
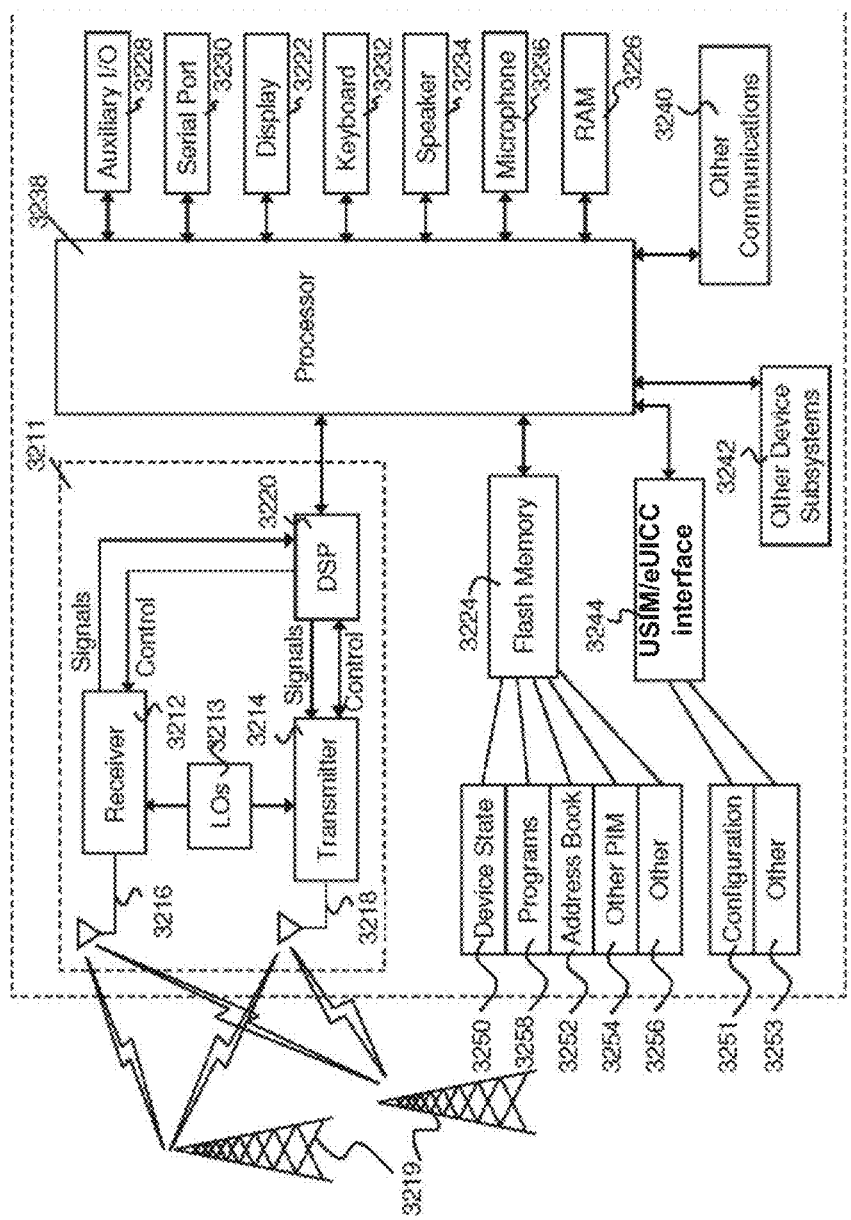
FIG. 16 is a diagram of an embodiment of a communications device.

Further, the various methods or operations described herein may be implemented by a communications device (e.g., UEs, network nodes, TEs, etc.). An example of a communications device is described below with regard to FIG. 16. The communications device 3200 may comprise a two-way wireless communication device having voice and data communication capabilities. In some embodiments, voice communication capabilities are optional. The communications device 3200 may have the capability to communicate with other computer systems on the Internet. Depending on the exact functionality provided, the communications device 3200 may be referred to as a data messaging device, a two-way pager, a wireless e-mail device, a cellular telephone with data messaging capabilities, a wireless internet appliance, a wireless device, a smart phone, a mobile device, or a data communication device, as examples.

Where the communications device 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. The particular design of the communication subsystem 3211 may be dependent upon the communication network 3219 in which the communications device 3200 is intended to operate.

Network access may also vary depending upon the type of communication network 3219. In some networks, network access is associated with a subscriber or user of the communications device 3200. The communications device 3200 may use a USIM or eUICC in order to operate on a network. The USIM/eUICC interface 3244 is typically similar to a card slot into which a USIM/eUICC card may be inserted. The USIM/eUICC card may have memory and may hold many key configurations 3251 and other information 3253, such as identification and subscriber-related information.

When network registration or activation procedures have been completed, the communications device 3200 may send and receive communication signals over the communication network 3219. As illustrated, the communication network 3219 may comprise multiple base stations communicating with the communications device 3200.

Signals received by antenna element 3216 through communication network 3219 are input to receiver 3212, which may perform such common receiver functions such as signal amplification, frequency down conversion, filtering, channel selection, and the like. Analog to digital (ND) conversion of a received signal allows more complex communication functions, such as demodulation and decoding to be performed in the DSP 3220. In a similar manner, signals to be transmitted are processed, including modulation and encoding for example, by DSP 3220 and are input to transmitter 3214 for digital to analog (D/A) conversion, frequency up conversion, filtering, amplification, and transmission over the communication network 3219 via antenna element 3218. DSP 3220 not only processes communication signals but also provides for receiver and transmitter control. For example, the gains applied to communication signals in receiver 3212 and transmitter 3214 may be adaptively controlled through automatic gain control algorithms implemented in DSP 3220.

The communications device 3200 generally includes a processor 3238 which controls the overall operation of the device. Communication functions, including data and voice communications, are performed through communication subsystem 3211 in cooperation with the processor 3238. Processor 3238 also interacts with further device subsystems such as the display 3222, flash memory 3224, random access memory (RAM) 3226, auxiliary input/output (I/O) subsystems 3228, serial port 3230, one or more user interfaces such as keyboards or keypads 3232, speaker 3234, microphone 3236, one or more other communication subsystems 3240 such as a short-range communications subsystem, and any other device subsystems generally designated as 3242. While the other communication subsystems 3240 and other device subsystems 3242 are depicted as separate components in FIG. 16, it is to be understood that other communication subsystems 3240 and other device subsystems 3242 (or parts thereof) may be integrated as a single component. Serial port 3230 may include a universal serial bus (USB) port or other port currently known or developed in the future.

Some of the illustrated subsystems perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions, such as a calculator or task list.

Operating system software used by the processor 3238 may be stored in a persistent store such as flash memory 3224, which may instead be a read-only memory (ROM) or similar storage element (not shown). The operating system, specific device applications, or parts thereof, may be temporarily loaded into a volatile memory such as RAM 3226. Received communication signals may also be stored in RAM 3226.

As shown, flash memory 3224 may be constituted by different areas for both computer programs 3258 and program data storage 3250, 3252, 3254, and 3256. These different storage types indicate that each program may allocate a portion of flash memory 3224 for their own data storage use. Processor 3238, in addition to its operating system functions, may enable execution of software applications on the communications device 3200. A predetermined set of applications that control basic operations, including at least data and voice communication applications for example, may typically be installed on the communications device 3200 during manufacturing. Other applications may be installed subsequently or dynamically.

Applications and software may be stored on any computer-readable storage medium. The computer-readable storage medium may be tangible or in a transitory/non-transitory medium such as optical (e.g., CD, DVD, etc.), magnetic (e.g., tape), or other memory currently known or developed in the future.

Software applications may be loaded onto the communications device 3200 through the communication network 3219, an auxiliary I/O subsystem 3228, serial port 3230, other short-range communications subsystem(s) 3240, or any other suitable device subsystem(s) 3242, and installed by a user in the RAM 3226 or a non-volatile store (not shown) for execution by the processor 3238. Such flexibility in application installation may increase the functionality of the communications device 3200 and may provide enhanced on-device functions, communication-related functions, or both. For example, secure communication applications may enable electronic commerce functions and other such financial transactions to be performed using the communications device 3200.

In a data communication mode, a received signal such as a text message or web page download may be processed by the communication subsystem 3211 and input to the processor 3238, which may further process the received signal for output to the display 3222, or alternatively to an auxiliary I/O device 3228.

For voice communications, overall operation of the communications device 3200 is similar, except that received signals may typically be output to a speaker 3234 and signals for transmission may be generated by a microphone 3236. Alternative voice or audio I/O subsystems, such as a voice message recording subsystem, may also be implemented on the communications device 3200. Although voice or audio signal output may be accomplished primarily through the speaker 3234, display 3222 may also be used to provide an indication of the identity of a calling party, the duration of a voice call, or other voice call-related information, for example.

Serial port 3230 may be implemented in a personal digital assistant (PDA)-type device for which synchronization with a user's desktop computer (not shown) may be desirable, but such a port is an optional device component. Such a serial port 3230 may enable a user to set preferences through an external device or software application and may extend the capabilities of the communications device 3200 by providing for information or software downloads to the communications device 3200 other than through a wireless communication network 3219. The alternate download path may, for example, be used to load an encryption key onto the communications device 3200 through a direct and thus reliable and trusted connection to thereby enable secure device communication. Serial port 3230 may further be used to connect the device to a computer to act as a modem.

Other communications subsystems 3240, such as a short-range communications subsystem, are further optional components which may provide for communication between the communications device 3200 and different systems or devices, which need not necessarily be similar devices. For example, one or more other communications subsystems 3240 may include an infrared device and associated circuits and components or a Bluetooth™ communication module to provide for communication with similarly enabled systems and devices. Other communications subsystems 3240 may further include non-cellular communications such as WI-FI, WiMAX, near field communication (NFC), BLUETOOTH, ProSe (Proximity Services) (e.g., sidelink, PC5, D2D, etc.), and/or radio frequency identification (RFID). The other communications subsystem(s) 3240 and/or other device subsystem(s) 3242 may also be used to communicate with auxiliary devices such as tablet displays, keyboards, or projectors.

Figure 17:
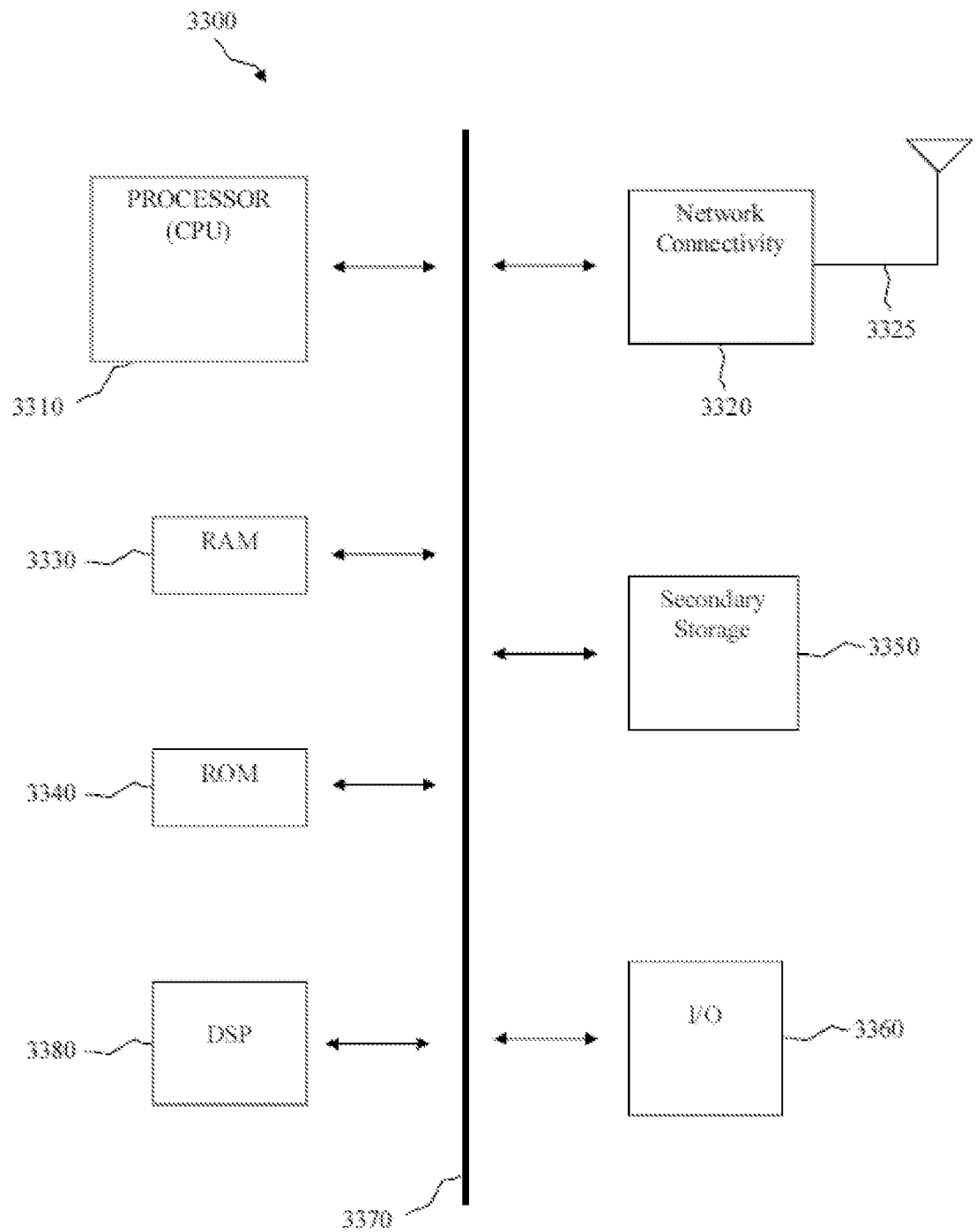
FIG. 17 is a diagram of an embodiment of a system suitable for implementing one or more embodiments disclosed herein.

The communications device 3200 and other components described above might include a processing component that is capable of executing instructions related to the actions described above. FIG. 17 illustrates an example of a system 3300 that includes a processing component 3310 suitable for implementing one or more embodiments disclosed herein. In addition to the processor 3310 (which may be referred to as a central processor unit or CPU), the system 3300 might include network connectivity devices 3320, random access memory (RAM) 3330, read only memory (ROM) 3340, secondary storage 3350, and input/output (I/O) devices 3360. These components might communicate with one another via a bus 3370. In some cases, some of these components may not be present or may be combined in various combinations with one another or with other components not shown. These components might be located in a single physical entity or in more than one physical entity. Any actions described herein as being taken by the processor 3310 might be taken by the processor 3310 alone or by the processor 3310 in conjunction with one or more components shown or not shown in the drawing, such as a digital signal processor (DSP) 3380. Although the DSP 3380 is shown as a separate component, the DSP 3380 might be incorporated into the processor 3310.

The processor 3310 executes instructions, codes, computer programs, or scripts that it might access from the network connectivity devices 3320, RAM 3330, ROM 3340, or secondary storage 3350 (which might include various disk-based systems such as hard disk, floppy disk, or optical disk). While only one CPU 3310 is shown, multiple processors may be present. Thus, while instructions may be discussed as being executed by a processor, the instructions may be executed simultaneously, serially, or otherwise by one or multiple processors. The processor 3310 may be implemented as one or more CPU chips.

The network connectivity devices 3320 may take the form of modems, modem banks, ethernet devices, universal serial bus (USB) interface devices, serial interfaces, token ring devices, wireless local area network (WLAN) devices, radio transceiver devices such as code division multiple access (CDMA) devices, Global System for Mobile communication (GSM) radio transceiver devices, universal mobile telecommunications system (UMTS) radio transceiver devices, LTE radio transceiver devices, new generation radio transceiver devices, worldwide interoperability for microwave access (WiMAX) devices, and/or other well-known devices for connecting to networks. These network connectivity devices 3320 may enable the processor 3310 to communicate with the internet or one or more telecommunications networks or other networks from which the processor 3310 might receive information or to which the processor 3310 might output information. The network connectivity devices 3320 might also include one or more transceiver components 3325 capable of transmitting and/or receiving data wirelessly.

The RAM 3330 might be used to store volatile data and perhaps to store instructions that are executed by the processor 3310. The ROM 3340 is a non-volatile memory device that typically has a smaller memory capacity than the memory capacity of the secondary storage 3350. ROM 3340 might be used to store instructions and perhaps data that are read during execution of the instructions. Access to both RAM 3330 and ROM 3340 is typically faster than to secondary storage 3350. The secondary storage 3350 is typically comprised of one or more disk drives or tape drives and might be used for non-volatile storage of data or as an over-flow data storage device if RAM 3330 is not large enough to hold all working data. Secondary storage 3350 may be used to store programs that are loaded into RAM 3330 when such programs are selected for execution.

The I/O devices 3360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver component 3325 might be considered to be a component of the I/O devices 3360 instead of or in addition to being a component of the network connectivity devices 3320.

The following are incorporated herein by reference for all purposes: 3GPP TS.24.301, and 3GPP TS 24.501.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method in a user equipment (UE) for transferring an ongoing emergency session from a first network to a second network, the method comprising:
    transmitting a first registration request message to the second network;
    receiving a registration reject message from the second network;
    detecting the ongoing emergency session between the UE and the first network is ongoing;
    transmitting, responsive to detecting the ongoing emergency session, a second registration request message comprising an emergency registration request to the second network; and
    receiving a registration accept message,
    wherein the first registration request message is a first attach request message and the second registration request message is a second attach request message,
    wherein the first attach request message comprises a first connection request message, the first connection request message not comprising an emergency handover indication, and wherein the second attach request message comprises a second connection request message, the second connection request message comprising an emergency handover indication.

2. The method of claim 1, wherein the registration reject message comprises a cause code.

3. The method of claim 2, wherein prior to transmitting the second registration request message, the method further comprises determining that the cause code does not indicate that one of an international mobile equipment identifier (IMEI) or a permanent equipment identifier (PEI) of the UE is not accepted.

4. The method of claim 3, further comprising entering one of a state EMM-DERGISTERED.NO-IMSI or a state 5GMM-DEREGISTERE.NO-SUPI when the UE determines the cause code indicates that one of the IMEI or the PEI of the UE is not accepted.

5. The method of claim 1, wherein the first network is a fifth generation (5G) network and wherein the second network is a fourth generation (4G) network.

6. A user equipment (UE) comprising:
    a processor; and
    a memory storing instructions which, when executed by the processor, cause the UE to:
        transmit a first registration request message to a second network;
        receive a registration reject message from the second network;
        detect an emergency session between the UE and a first network is ongoing;
        transmit, responsive to detecting the emergency session, a second registration request message comprising an emergency registration request to the second network; and
        receive a registration accept message for the emergency session,
        wherein the first registration request message is a first attach request message and the second registration request message is a second attach request message, wherein the first attach request message comprises a first connection request message, the first connection request message not comprising an emergency handover indication, and wherein the second attach request message comprises a second connection request message, the second connection request message comprising an emergency handover indication.

7. The UE of claim 6, wherein the registration reject message comprises a cause code.

8. The UE of claim 7, wherein the instructions further cause the UE to determine that the cause code does not indicate that one of an international mobile equipment identifier (IMEI) or a permanent equipment identifier (PEI) of the UE is not accepted.

9. The UE of claim 8, wherein the instructions further cause the UE to enter one of a state EMM-DERGISTERED.NO-IMSI or a state 5GMM-DEREGISTERE.NO-SUPI when the UE determines the cause code indicates that one of the IMEI or the PEI of the UE is not accepted.

10. The UE of claim 6, wherein the first network is a fifth generation (5G) network and wherein the second network is a fourth generation (4G) network.

11. A non-transitory computer readable storage medium comprising instructions which, when executed by a processor, cause the processor to:
   transmit a first registration request message to a second network;
   receive a registration reject message from the second network;
   detect an emergency session between a user equipment (UE) and a first network is ongoing;
   transmit, responsive to detecting the emergency session, a second registration request message comprising an emergency registration request to the second network; and
   receive a registration accept message for the emergency session,
   wherein the first registration request message is a first attach request message and the second registration request message is a second attach request message,
   wherein the first attach request message comprises a first connection request message, the first connection request message not comprising an emergency handover indication, and wherein the second attach request message comprises a second connection request message, the second connection request message comprising an emergency handover indication.

12. The non-transitory computer readable storage medium of claim 11, wherein the registration reject message comprises a cause code.

13. The non-transitory computer readable storage medium of claim 12, wherein the instructions further cause the processor to determine that the cause code does not indicate that one of an international mobile equipment identifier (IMEI) or a permanent equipment identifier (PEI) of the UE is not accepted.

14. The non-transitory computer readable storage medium of claim 13, wherein the instructions further cause the processor to enter one of a state EMM-DERGISTERED.NO-IMSI or a state 5GMM-DEREGISTERE.NO-SUPI when the UE determines the cause code indicates that one of the IMEI or the PEI of the UE is not accepted.

* * * * *